United States Patent [19]

Ruggles

[11] Patent Number: 5,670,008
[45] Date of Patent: Sep. 23, 1997

[54] METHOD FOR FABRICATING HONEYCOMB INSULATING MATERIAL

[75] Inventor: Kay L. Ruggles, Salt Lake City, Utah

[73] Assignee: Newell Operating Company, Freeport, Ill.

[21] Appl. No.: 276,174

[22] Filed: Jul. 15, 1994

Related U.S. Application Data

[63] Continuation of Ser. No. 870,574, Apr. 17, 1992, Pat. No. 5,441,592, which is a continuation-in-part of Ser. No. 773,843, Oct. 7, 1991, Pat. No. 5,308,435.

[51] Int. Cl.$^6$ ........................................ B32B 31/12
[52] U.S. Cl. ........................ 156/264; 156/201; 156/291; 156/512; 156/558
[58] Field of Search ..................... 156/197, 200, 156/201, 202, 264, 290, 291, 512, 558, 563, 578, 580, 459, 466; 414/794.9, 795.3

[56] References Cited

U.S. PATENT DOCUMENTS

| | | | |
|---|---|---|---|
| 3,007,698 | 11/1961 | MacDonald et al. | 271/212 |
| 3,165,820 | 1/1965 | Fromson | 156/197 X |
| 3,477,893 | 11/1969 | Brazener et al. | 156/197 |
| 3,493,450 | 2/1970 | Judge, Jr. | 156/197 |
| 3,713,954 | 1/1973 | Clark | 156/548 |
| 3,834,290 | 9/1974 | Nelson | 414/789.1 |
| 3,866,765 | 2/1975 | Stobb | 271/212 X |
| 3,979,252 | 9/1976 | Hoyt | 156/197 X |
| 4,450,027 | 5/1984 | Colson | 156/193 |
| 4,849,039 | 7/1989 | Colson et al. | 156/197 |
| 5,228,936 | 7/1993 | Goodhue | 156/260 |
| 5,334,275 | 8/1994 | Romeo et al. | 156/197 X |

FOREIGN PATENT DOCUMENTS

| | | |
|---|---|---|
| 726976 | 6/1932 | France . |
| 1568745 | 5/1969 | France . |
| 2632291 | 12/1989 | France . |
| 6706563 | 11/1968 | Netherlands . |

*Primary Examiner*—Melvin Mayes
*Attorney, Agent, or Firm*—Foley & Lardner

[57] ABSTRACT

A method for producing one or more individual stacks of superimposed, secured together, expandable tubular strips forming an expandable honeycomb panel. The strips coated with adhesive are advanced sequentially to the inlet of a stacking chamber having an elevated floor with a longitudinally extending slot of a length to receive each strip and which is narrower than the width of the strips to be delivered thereto. The strip so delivered is pushed up through the narrower slot and against the strip just previously delivered to the chamber, to adhere it to the latter strip. The chamber has a weight bar to exert a downward force on the stack of strips to provide good adherence between the strip.

4 Claims, 19 Drawing Sheets

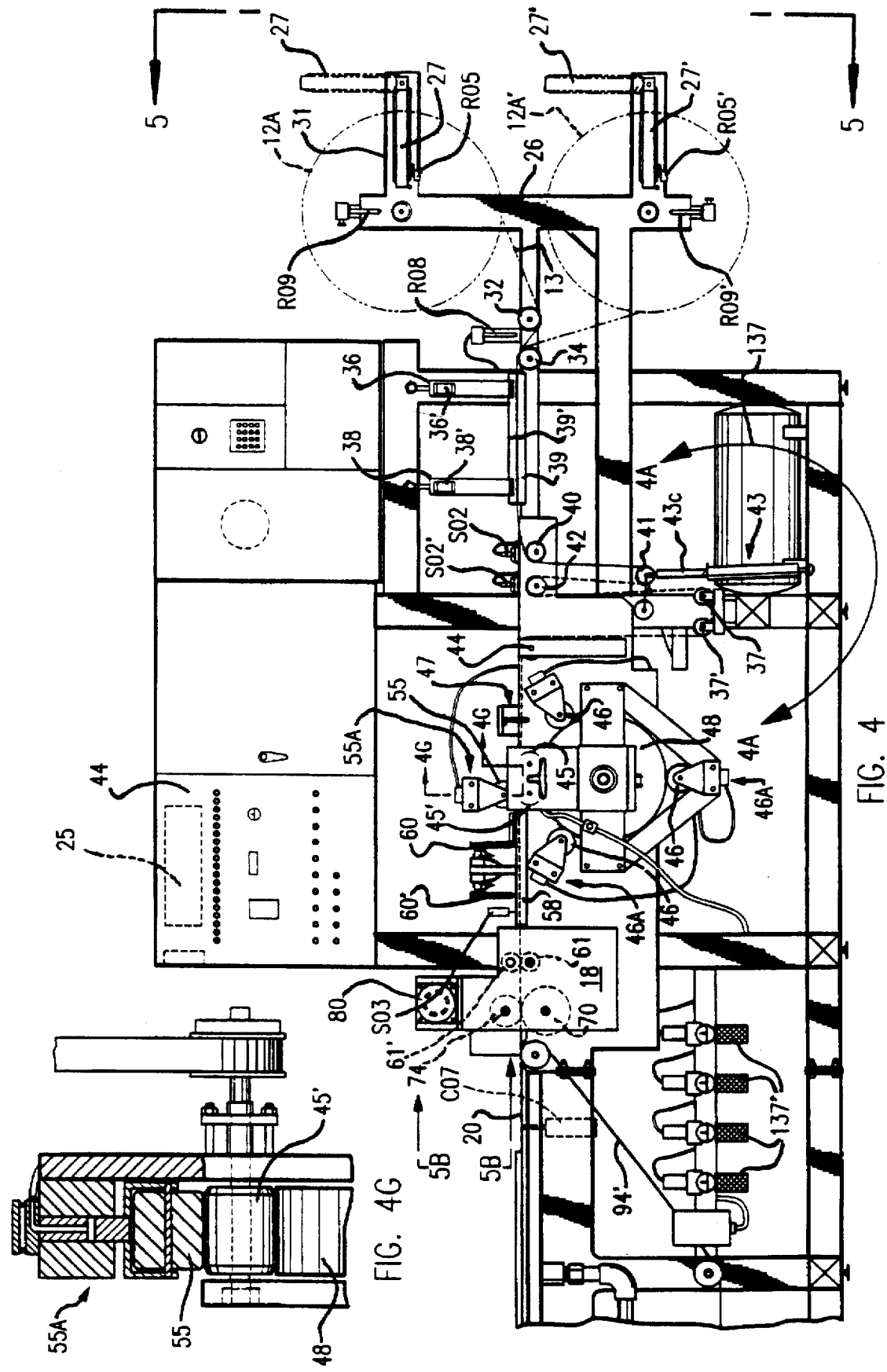

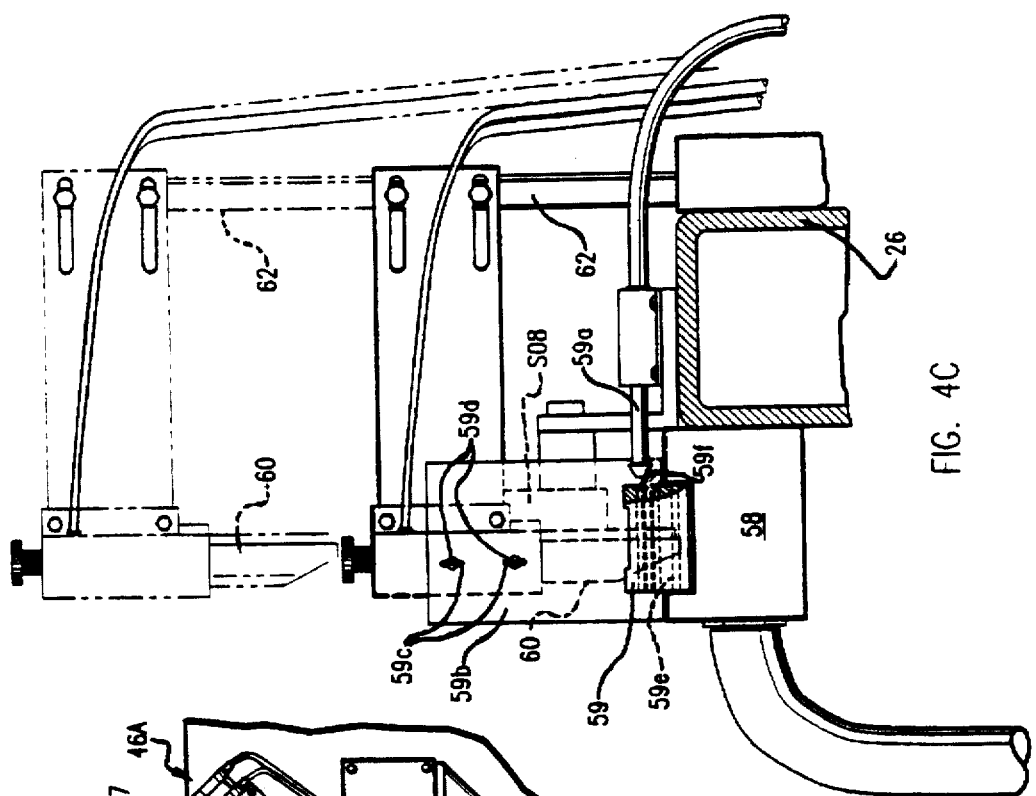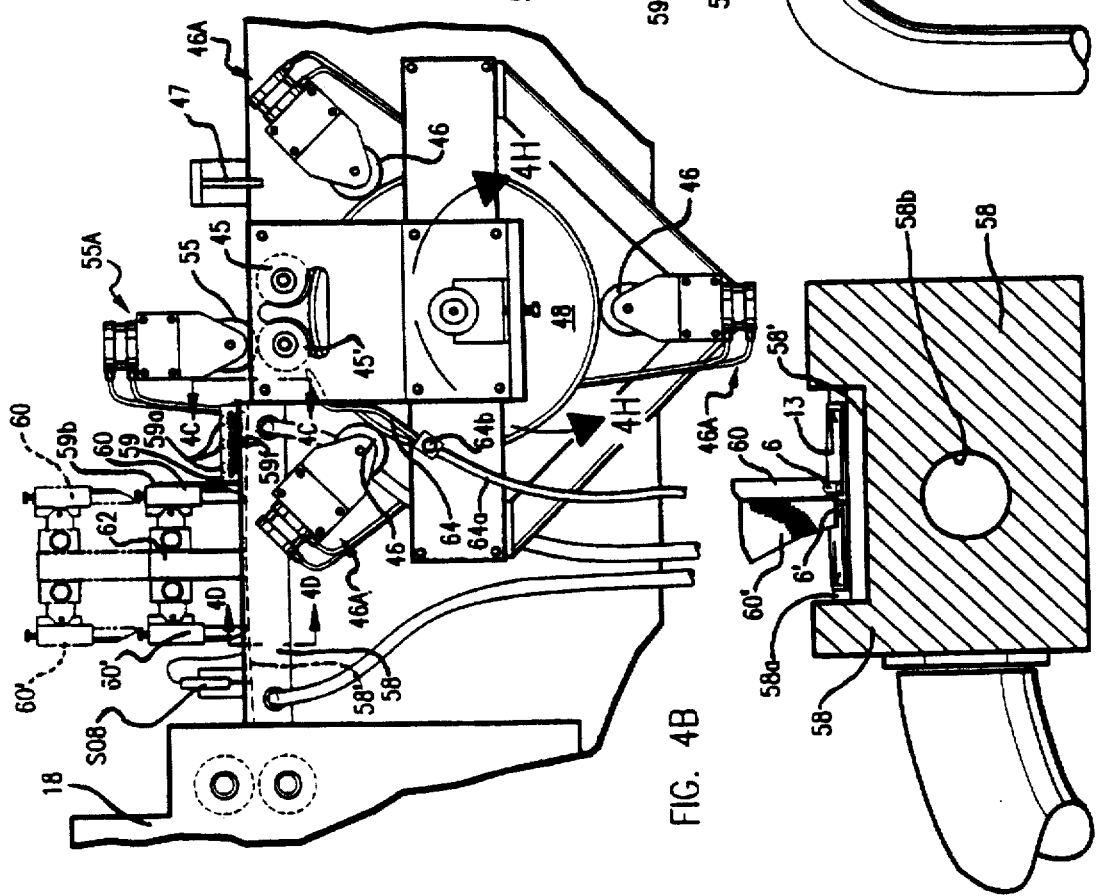

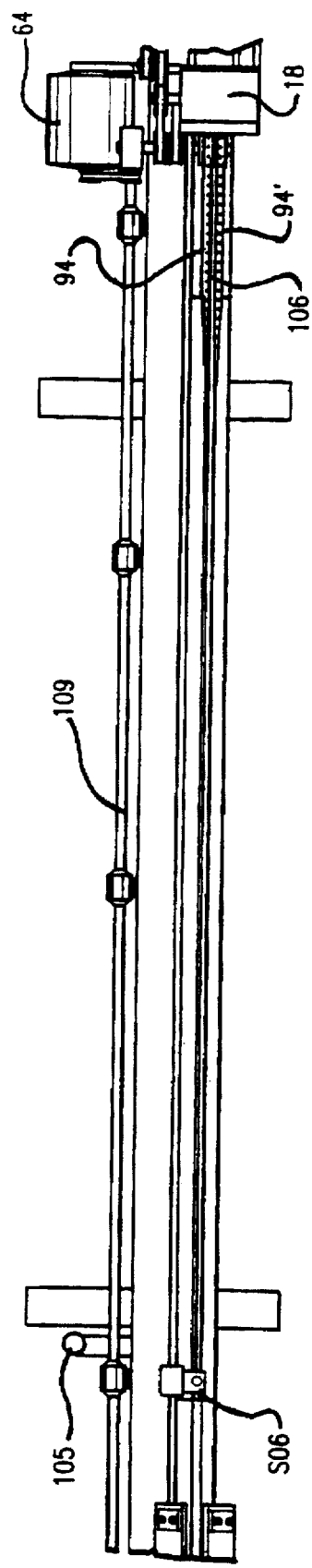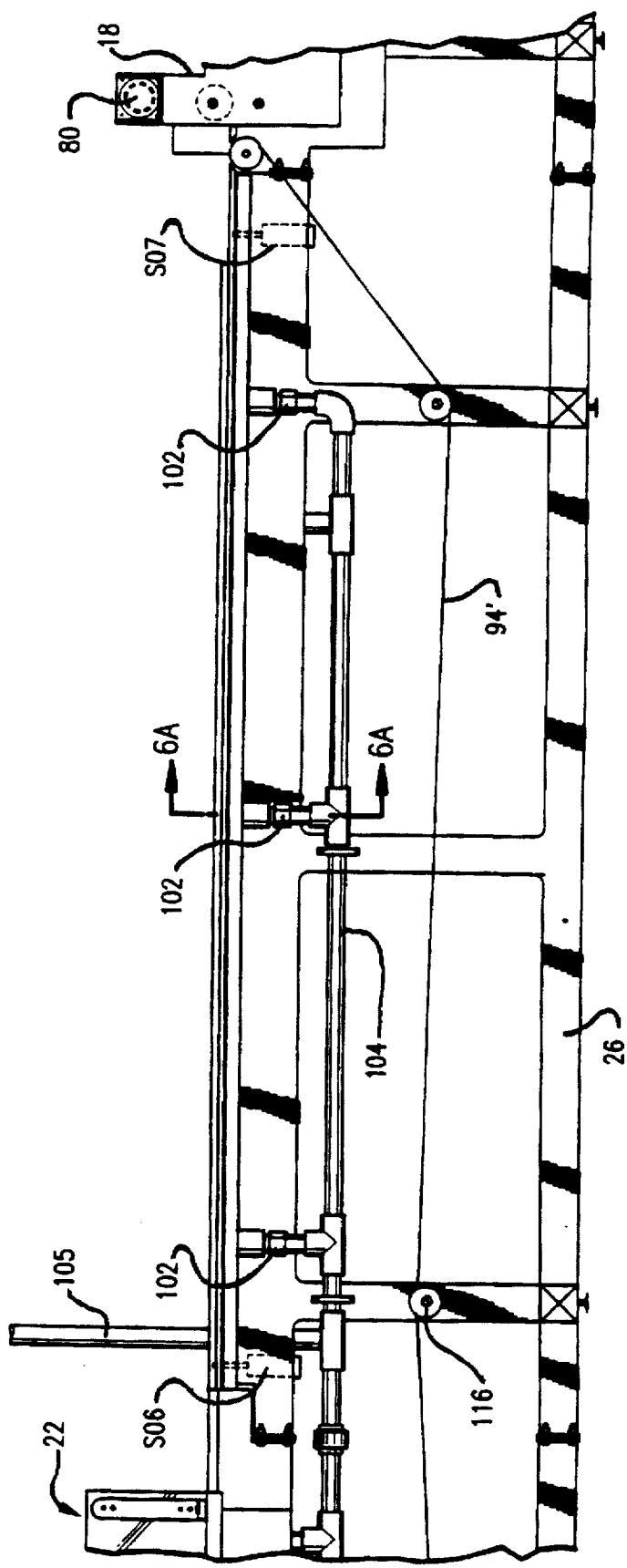
FIG. 7
FIG. 6

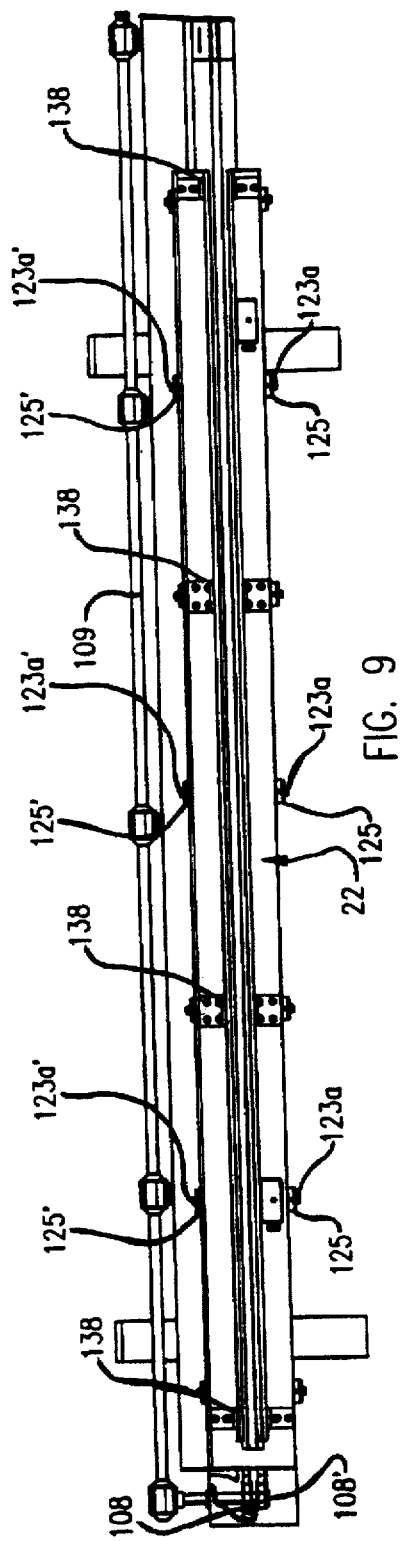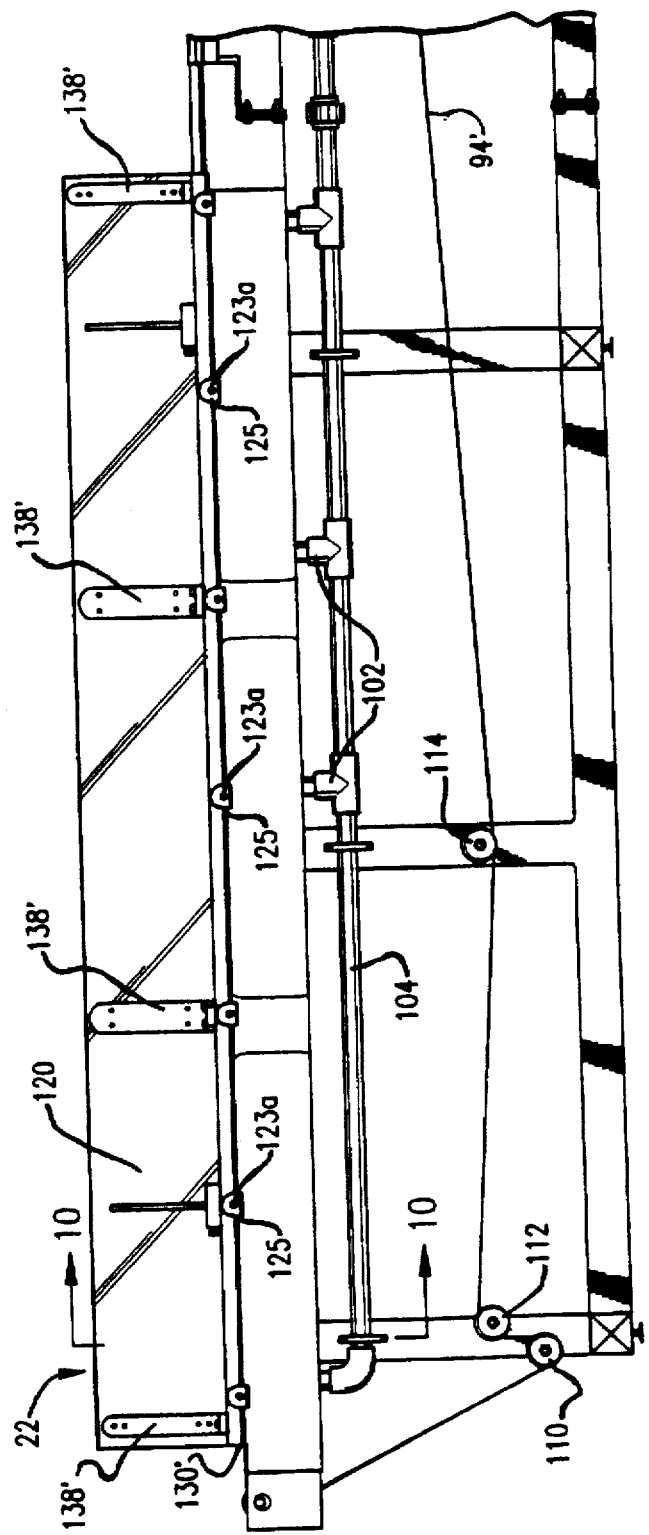

METHOD FOR FABRICATING HONEYCOMB INSULATING MATERIAL

RELATED APPLICATION

This is a continuation of application Ser. No. 07/870,574, filed on Apr. 17, 1992, now U.S. Pat. No. 5,441,592, which is a continuation-in-part of Ser. No. 07/773,843, filed on Oct. 7, 1991, now U.S. Pat. No. 5,308,435 issued on May 3, 1994.

FIELD OF THE INVENTION

The present invention has its most important application in the mass production of individual stacks of secured together, flat, flexible expandable tubular strips from which expandable honeycomb panels of a desired overall width and expandable length can be cut. The fabricators then assemble the pleated panels with various hardware, like support rails and pull cords, to form the completed assembly which is installed in the user's homes to cover windows and other openings.

The present invention deals with a method and apparatus for receiving a continuous web forming a continuous, expandable flat tube, and by a unique combination of folding, fold-setting, cutting, adhesive-applying and stacking operations efficiently produce said stacks of secured together flat tubular strips with a minimum of imperfections.

BACKGROUND OF INVENTION

Various methods and apparatus have been heretofore developed for making expandable honeycomb insulation panels. Most, if not all, of these methods leave much to be desired from the standpoint of production efficiency and reliability.

Dutch Application Serial No. 6706563 of Landa, published Nov. 11, 1968 discloses the formation of such a panel from a number of narrow webs of thermoplastic material each of which are unwound from a roll in an unfolded state. The longitudinal edges of each web are tightly folded over, an end strip of a given length is then severed from each web, and the severed strips are then simultaneously superimposed. The superimposed strips are then welded together to form an expandable honeycomb panel.

U.S. Pat. No. 3,493,450 to Judge, Jr. discloses a method of making expandable honeycomb panels by applying laterally extending bands of adhesive to a web of sheet material and cutting individual strips from the web. A vacuum pick-up device picks up the severed and adhesive coated strips of material and sequentially delivers the individual strips above a stacking station where they are stacked one upon the other. In the process of being stacked, the adhesive adheres the adjacent strips together to form an expandable honeycomb panel structure. The completed honeycomb structure is then cut into narrow strips of a desired width to form expandable honeycomb panels.

U.S. Pat. No. 4,450,027 to Colson discloses another method and apparatus for making expandable honeycomb insulation panels. Like the method disclosed in the Judge, Jr. Patent, the Colson method starts with a continuous web of unfolded material and, like the method disclosed in the Landa published application, progressively folds over the opposite longitudinal edges of the web. The Colson method then applies a continuous band of adhesive to one side of the web. The adhesive-coated continuous web, unlike the method disclosed in the Landa and Judge, Jr. prior art, is continuously wound on a rotating stacker. The wound web is removed from the stacker and cut into separate stacks of a desired length.

The present method and apparatus to be described produces in a very efficient and reliable manner individual stacks of expandable honeycomb material, and without infringing known patents of others.

SUMMARY OF THE INVENTION

The present invention preferably starts with a single continuous web forming a continuous flat tube. While the flat tube could be formed in any manner for the purposes of certain aspects of the present invention, it is preferably formed from an unfolded web whose opposite longitudinal edges are folded over in the manner to be described. When the web material is a thermoplastic material, folds in the web are set by passing the web around a preferably rotatable heated cylindrical drum, the folded web being sandwiched between the surface of the drum and one or more abutment surfaces. An adhesive is applied to the web preferably in one or more continuous bands running longitudinally of the web. The adhesive coated web is then sequentially cut into strips, and then sequentially stacked in a uniquely designed stacking chamber and in a completely different manner than that carried out in all of the aforesaid described prior art methods.

In the unique stacking system of the invention, a vertical stacking chamber is elevated above a strip delivery inlet point. The elevated bottom floor of this chamber has a longitudinally extending slot which is narrower than the width of the strips to be delivered thereto and of a length to receive each strip. Each strip, preferably coated with adhesive along the central region thereof, is delivered to this inlet point one at a time at spaced time intervals where each strip is pushed up through this slot and against the bottom face of the strip in the chamber above it to bond the strips together. The strip delivered into the stacking chamber preferably pushes against the strip above it, to a degree which raises all the strips above it to assure a good adhesive bond between all the strips. While the defining walls of the slot could be defined by a pair of spaced resilient strips which flex as the narrower more rigid yet flexible strips are pushed thereby, it is preferably defined by spaced rigid walls, so that each flexible strip bows upwardly as it is pushed through the slot.

In accordance with another feature of the invention, bonding of all the strips to be stacked is achieved by both an upward and downward force on the strips in the stacking chamber. The upward force is achieved by pushing the new strip into the stacking chamber to a degree which raises the strips above it. The downward force can be achieved by a weight bar placed in the chamber which is progressively raised by the strips being stacked in the chamber below it. When the chamber is full, the bar and the stacked strips are removed from the chamber.

The only prior art stacking systems known to the applicants which stack pieces of material from the bottom of the stack do so with pieces of rigid sheet material. When these rigid sheets are delivered to the inlet of the stacking chamber they engage a vertical abutment which aligns the pieces and makes it readily possible to stack successive pieces from the bottom of the stack. Examples of this prior art are the stacking systems shown in U.S. Pat. Nos. 3,866,765 to Stobb and U.S. Pat. No. 3,834,290 to Nelson. Such an abutment wall is not suitable for stacking the flexible strips used to make honeycomb panels.

While in accordance with a broad aspect of the present invention the adhesive could be selectively applied to the tubular strips of the present invention after they are severed from a continuous web, it is most advantageously applied to the top of the web before the strips are cut therefrom. If separable stacks are to be formed in the stacking chamber, the adhesive could be applied to the web before it is cut into strips in a discontinuous pattern, where an adhesive applicator means is periodically momentarily shut off when widely spaced portions of the web passing the adhesive applicator means is to constitute the first strip in each secured together stack of strips to be formed in the stacking chamber. When the adhesive is applied to the strips after they have been severed from the web, the adhesive applicator means must be repeatedly turned on and off quickly, as the short strips pass thereby, so that adhesive will not drip in the gaps between the strips. This could severely limit the speed of the production line to prevent adhesive from falling into these gaps.

In the preferred form of the invention, where one continuous stack of secured together strips is produced in the stacking chamber, there are no adhesive timing control problems to be concerned about. This is the preferred form because it was found that when a strip with no adhesive applied thereto is pushed into the stacking chamber, it can readily become wrinkled because it is not adhered along its length to the strip above it. This also can cause wrinkling in the strips below. For this reason also, there is placed below the weight-producing bar a rigid strip of cardboard or other material to which the uppermost strip in the stacking chamber adheres. This rigid cardboard strip can be readily pulled from this uppermost strip without tearing it after all the secured together strips are removed from the stacking chamber.

For maximum production efficiency, it is preferred that the web be moved continuously past the folding, fold-setting, adhesive applying and cutting stations. In such case, as a strip is cut from the web it must be separated from the next strip to be cut from the web and delivered to the stacking chamber where a pusher means has time to be raised and lowered to deliver the strip to the stacking chamber, before the next strip is delivered thereto. To this end, the conveyer system extending from the outlet of the cutting station to the inlet of the stacking chamber moves at a much higher speed than the conveying means which moves the web to the cutting station.

The high speed conveyer advantageously comprises a pair of laterally spaced suction belts between which a raisable narrow bar is mounted to pass between the belts and into the slot in the bottom of the stacking chamber. As the bar moves up from a lowered position, it pushes the strip from the suction belts and delivers the strip into the stacking chamber as previously described.

Other features of the invention claimed herein are described and shown in the drawings which improve the efficiency and reliability of the method and apparatus aspects of the invention. These include the structural details of the stacking chamber and a unique method and apparatus for controlling the distribution of forces between the above mentioned heated drum and the abutment-forming surfaces which set the folds in the web. Other features of the invention involve the use of sensors at various points in the system to monitor the operation of the fabricating equipment involved to achieve maximum production efficiency. For example, sensors are preferably provided which sense when the conveyor system reaches a desired speed, the presence of a spliced section of the web, the absence of an adhesive band, and the passage of the trailing edge of a strip cut from the web. Some of these sensors will stop the production line when conditions indicating a problem in the production line making desirable the cessation of production are sensed. Others reset a counter controlling the time a strip is raised into the stacking chamber, or disable a strip raising operation so that a cut strip will not be stacked if it is one containing a splice.

DESCRIPTION OF DRAWINGS

FIG. 4 is a front elevational view of the preferred apparatus of the invention up to the inlet section of the second conveyor section referred to previously;

FIG. 4B is an enlarged elevational view of the heating drum and adhesive applicator portions of the equipment shown in FIG. 4;

FIG. 4C is a transverse sectional view through the equipment shown in FIG. 4A, taken along viewing plane 4C—4C;

FIG. 4D is an enlarged transverse sectional view through a cooling table mounted beneath the glue applicators and shows the tip of the glue applicator depressing the web in a recess in the cooling table;

FIG. 4G is a sectional view through one of the pneumatically positioned roller units shown in FIG. 4, taken through viewing plane 4G—4G;

FIG. 4I is a vertical sectional view through the apparatus shown in FIG. 4H, as seen along viewing plane 4H—4H;

FIG. 6 is a side elevational view of a portion of the conveyor system leading from the cutting apparatus located at the end of the apparatus shown in FIG. 4;

FIG. 7 is a plan view of the conveyor apparatus shown in FIG. 6;

FIG. 8 is an elevational view of the end of the conveyor apparatus shown in FIGS. 6 and 7 and including the lifting and stacking apparatus located respectively below and above the conveyor apparatus there shown;

FIG. 9 is a plan view of the conveyor lifting and stacking apparatus shown in FIG. 8;

DESCRIPTION OF PREFERRED EXEMPLARY FORM OF THE INVENTION

Figure 1:
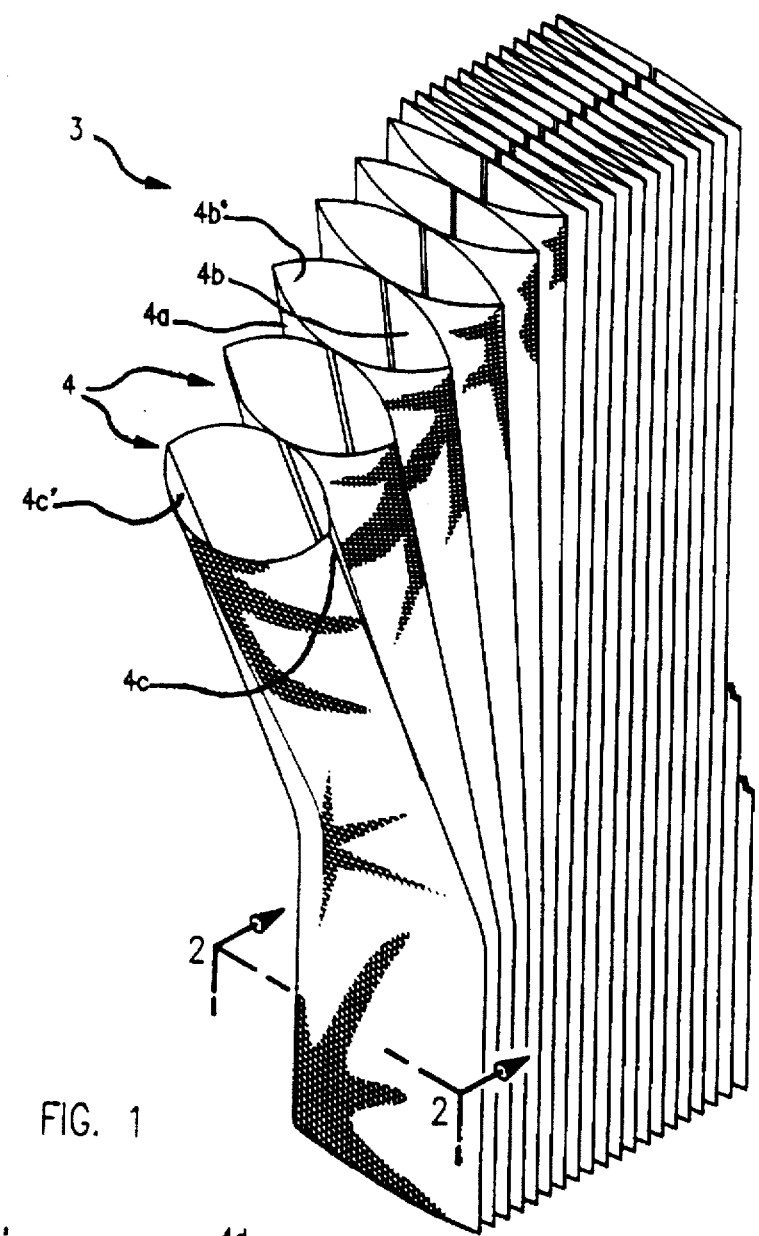
FIG. 1 is a perspective view of a part of one of the stacks of expandable honeycomb insulation material made by the method and apparatus of the present invention.
Figure 2:
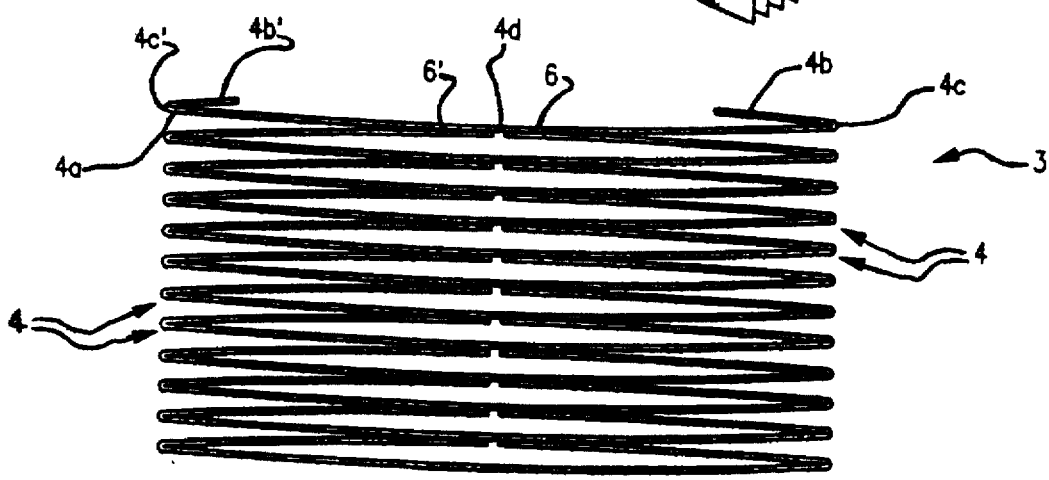
FIG. 2 is a transverse section through the stack of FIG. 1, taken along section line 2—2 therein.

FIGS. 1 and 2—The Product Made By The Present Invention

FIG. 1 is a perspective view of a part of one of the stacks 3 of expandable honeycomb insulation material made by the method and apparatus of the present invention, where the expandable honeycomb material is of the form disclosed in Dutch application Serial No. 6,508,988 of Landa, published Jan. 13, 1967. As shown in FIG. 1 herein, the stack 3 is made up of individual folded strips 4 of flexible material each forming a flattened, expandable tube when secured to the next strip by bands 6—6' of adhesive. The strips as illustrated are preferably formed from an initially unfolded web whose opposite longitudinal edge portions are preferably folded over at 4c—4c' in any desired way into contiguous but spaced relation to form permanently tightly folded over panels 4b—4b' overlying a bottom panel 4a. The strips 4 are cut from this web preferably after the bands 6—6' of adhesive are applied to the top portion of the web. The bands 6—6' of adhesive are applied only to the confronting end portions of the folded over panels 4b—4b'.

As previously indicated, the features of the present method and apparatus invention are applicable to tube-forming strips formed in ways other than by a folding process. Thus, for example, the panels 4b—4b' could constitute a single integral panel which is secured together to a separate panel of the same width at the opposite longitudinal margins of these panels. In either case, individual tube-forming strips are adhesively secured together and stacked in the unique manner previously described.

Figure 3:
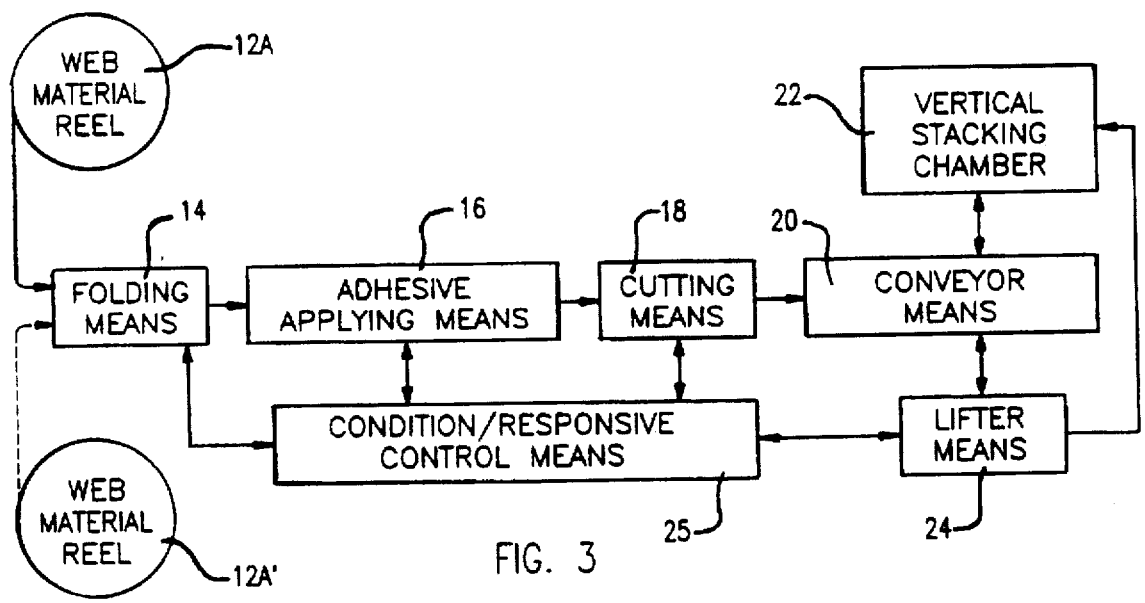
FIG. 3 is a block diagram showing the basic process step and apparatus elements of the present invention.

FIG. 3—Basic Block Diagram of the Invention

FIG. 3 illustrates in block form the basic method steps and apparatus elements used in the preferred form of manufacturing the stack 3 shown in FIGS. 1 and 2. A support structure is provided for preferably supporting two reels 12A—12A' of unfolded continuous, flexible web material of any desired construction, color and ornamentation used to form a honeycomb panel. These webs are respectively identified by reference numerals 13 and 13'. Only one of the reels 12A or 12A' is unwound at any time and threaded through the apparatus to be described. When the web material on one of the reels has been used up, the leading edge of the web of material wound on the other reel is spliced to the end of the web by a suitable tape.

As illustrated, the unfolded continuous web 13 or 13' of the roll 12A or 12A' is fed to folding means 14. The folding apparatus 14 includes folding means to be described for effectively folding over the opposite lateral edges of the web 13 or 13' to form the flat tubular configuration of the folded strips 4 shown in FIGS. 1 and 2. The folding means preferably includes fold setting means in the form of a heated drum whose shafts are uniquely supported as shown in FIGS. 4H–4K. FIGS. 4E and 4F to be described illustrate unique folding means which is disclosed and claimed in said co-pending application Ser. No. 07/773,843, now U.S. Pat. No. 5,368,935. The set folded web is then preferably fed first to adhesive applying means 16 and then to cutting means 18 which cuts individual, flat tube-forming strips from the web.

As previously explained, the adhesive applying means applies adhesive bands 6—6' to the spaced inner end portions of the folded over panels 4b—4b' preferably as a pair of continuous bands at the ends of the folded over portions of the web. The adhesive material is preferably an initially liquid thermosetting adhesive which sets partially in a relatively short period of time so that adjacent strips will be secured together to a sufficient degree when removed from the stacking chamber to be described, that they can withstand the rigors of subsequent handling. The adhesive sets completely over a long period of time to withstand the much greater pulling forces which are present when the panels cut from the stack of strips produced by the invention are cut into honeycomb panels of a desired length assembled with support rails and pull cords installed over windows and expanded and contracted many thousands of times by the owner's thereof in the useful life of the panels. Many such adhesives have been used in the prior art. One suitable adhesive is made by H. B. Fuller Company of 1200 Wolters Boulevard, Vadnais Heights, Minn. 55110. This material is a polyurethane resin adhesive identified as adhesive No. NP2028 when ordered from this company.

The various feed and guide rollers shown in other figures of the drawing to be described forming a part of the folding apparatus 14, adhesive applying means 16 and cutting means 18 constitute conveyor means described in some of the claims as a first conveyor section. They deliver the individual strips to a higher speed conveyor means 20 referred to in some of the claims as a second conveyor section. This second conveyor section operates at as much as twice the speed the peripheral speed of the feed rollers associated with the first conveyor section, so that the strips 4 cut from the folded web are conveyed to the inlet station of a vertical stacking chamber 22 at spaced time intervals. This permits a strip delivered to the inlet station of the stacking chamber to be stacked in the vertical stacking chamber 22 by a lifting means 24, sometimes also referred to as pusher means, which moves from an initial lowered position to a raised position and then back to a lowered position before the next strip is delivered to the inlet station.

As described previously, the bottom of the vertical stacking chamber 22 is defined by a pair of laterally-spaced support shoulders which forms a strip pass-through slot in the floor of the stacking chamber. The lifting means 24 may include an elongated bar shown in FIG. 10A raisable through the slot at the instant of time the strip becomes aligned with the slot and the strip or strips in the stacking chamber, to push the strip into the chamber preferably to an extent to raise the stack of strips above it. In so doing, the adhesive bands 6—6', which have not yet completely dried, are effectively pressed against the bottom panel 4a of the strip above it to adhere the two adjacent strips together. The drying time of the adhesive is sufficient that the strips are securely adhered by the time each stack of strips is removed from the stacking chamber.

To aid in the securement of adjacent strips together, a downward force is also preferably applied to the top of the stack involved. As previously indicated, in one form of the invention, this is produced by a weight-forming bar shown in FIG. 10A. This weight could also be obtained by the weight of the various strips in the stacking chamber above the bottom strip being moved into the stacking chamber.

A specific aspect of the invention deals with the manner in which the operation of the cutting conveyor and lifting means in FIG. 3 are controlled. This unique control means is identified in FIG. 3 as a block labelled condition-responsive control means 25 which includes software, the operation of which is shown in the functional block diagram of FIG. 11.

Preferred Apparatus for Splicing, Folding and Applying Adhesive to the Webs

Figure 5:
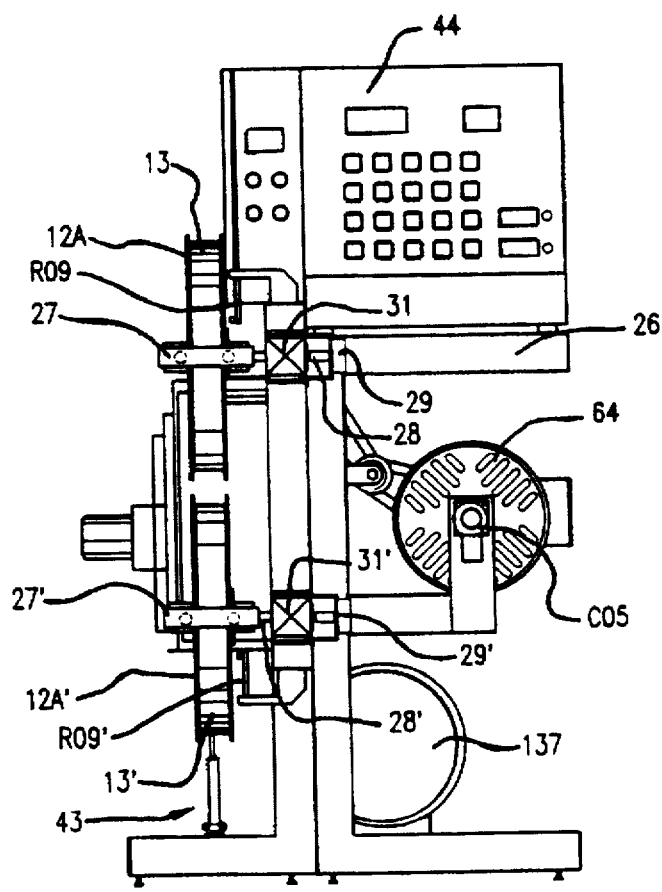
FIG. 5 is an end elevational view of the apparatus shown in FIG. 4 as seen in viewing plane 5—5.

Referring now to FIGS. 4 and 5, the reels 12A—12A of web material 12A and 12A' are fixed to rotatable shafts 28—28'. The shafts 28—28' extend from any suitable variable friction brake mechanism 29—29'. Such mechanism including the potentiometer and other material mechanism associated therewith can be purchased from Electroid Company, 45 Fadem Road, Springfield, N.J. 07081 under the purchase order designation Electroid TC-1 Tension Controller. These brake mechanisms produce a variable restraining force on the rotation of the reel support shafts 28—28' under control of suitable control signals from variable potentiometers responsive to the position of a dance arm, forming part of a web tension control mechanism to be described. This produces a fixed web tension in a manner well known in the prior art.

The operator initially can select the reel 12 or 12A'. Extending from projecting arms 31—31' on a support frame 26 are rotatably supported reel-positioning saddles 27—27'. When the saddles are moved to their horizontal position, they enclose the opposite sides of the associated reels 12A—12A' to precisely position these reels on the shafts 28—28'. Micro switches R05—R05' are respectively depressed when the associated saddles are in their horizontal positions capturing the reels 12A—12A'. The saddles 27—27' are moved to this horizontal position only when the associated reels are to be unwound and fed to the equipment to be described.

Supported adjacent to a side of the respective reels 12A—12A' are combined light source and light detecting sensor units R09 and R09' which respectively direct beams against the sides of the reels involved. When the web on the associated reel is completely unwound, light reflection ceases and the light sensor involved will indicate that the web involved has been completely unwound from the reel. When this occurs, the drive motor which operates the conveyor system which conveys the web through the equipment to be described ceases operation, to enable a splicing operation to be carried out with the web unwound from the other still unused reel.

When the upper reel 12A is selected, and the associated saddle 27 is moved to its horizontal operative position, the web material is then threaded beneath guide roller 32 and above guide roller 34 to incline upwardly to the left, as shown in FIG. 4. A combined light source and light sensor unit R08 directing light downwardly against the inclined web between the rollers 32 and 34 will be reflected away from the sensor part of the unit R08 when the web inclines upwardly to the left as viewed in FIG. 4.

If the lower reel 12A is selected, the web unwinding from the reel will extend under the roller 32 and over the roller 34, thus causing a path of light which strikes the sensor portion of the unit R08.

The web leaving the guide rollers 32–34 rides over the upper surface of a splicing table 39 which has a vertical slit 39' in the top surface thereof which extends for the width of the table. A pair of clamping bars 36–38 carrying magnets 36'–38' therein (FIG. 4A) are respectively mounted for pivotal movement along with housings 36a–38a in a vertical plane extending transverse to the length of the web passing over the table 39. The housings pivot on axes 36b–38b whereas the bars 36–38 pivot on axes 36c–38c. When one of the bars 36 or 38 is pulled into a horizontal position, an associated magnet presses and clamps the web against the top surface of the table 39.

When one of the sensor units R09 or R09' mounted adjacent the reel 12A or 12A' having its saddle 30 or 30' in a horizontal position senses the complete unwinding of web material from the associated active reel, the movement of the web through a drive motor 64 (FIG. 5) feeding the web is stopped. The bars 36–38 and their housings are rotated into their horizontal clamping positions. A sharp knife edge is pressed through the web into the table slit 39' to cleanly sever the web. The rear clamping bar 36 is then pivoted out of its clamping position and the resulting severed end section of the web is discarded. The web from the unused reel is then passed around the idler rollers 32–34 and the moved opposite the slit 39', where it is in abutment with the end of the web ahead of it. The clamping bar 36 is then returned to its clamping position and then splicing tape is then placed over the abutted webs to secure them together. The conveyor system for moving the web is then rendered operative by operating a start switch on control panel 44 (FIG. 5). The strip cut from the web containing the splice is automatically not stacked in a manner to be described to avoid producing a defective honeycomb panel.

Figure 4A:
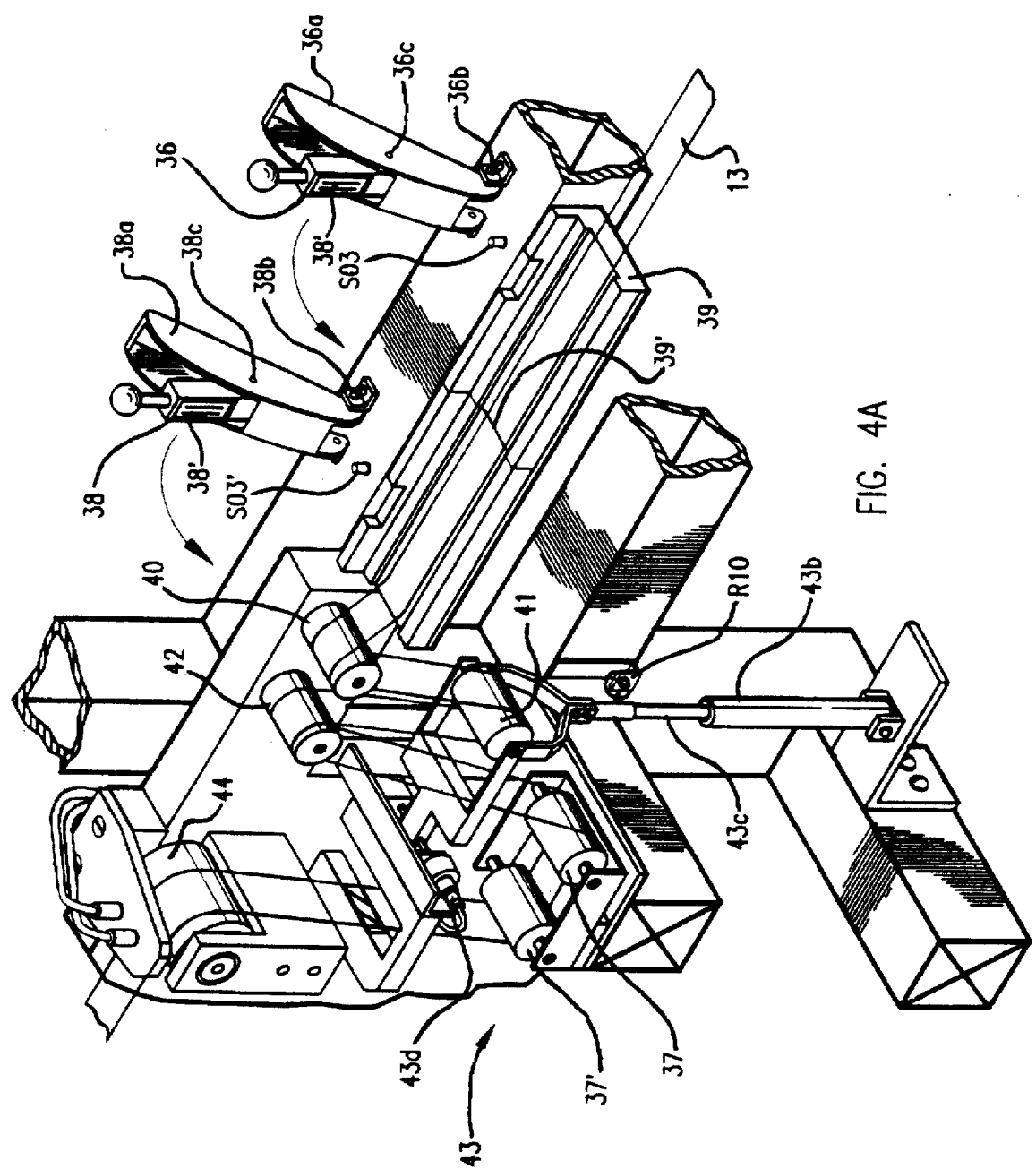
FIG. 4A is a transverse sectional view through the equipment shown in FIG. 4, taken along viewing plane 4A—4A.
Figure 4E:
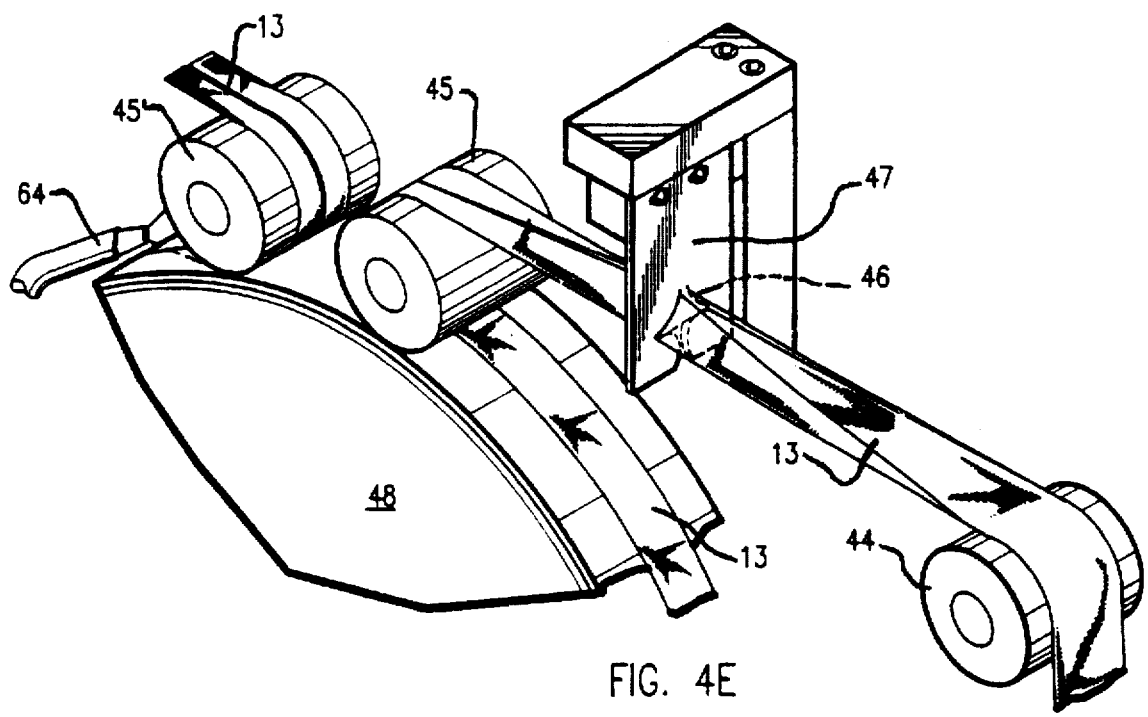
FIG. 4E is a perspective view of the folding station shown in FIG. 4, with an unfolded web being longitudinally folded through a slot in a guide plate.
Figure 4F:
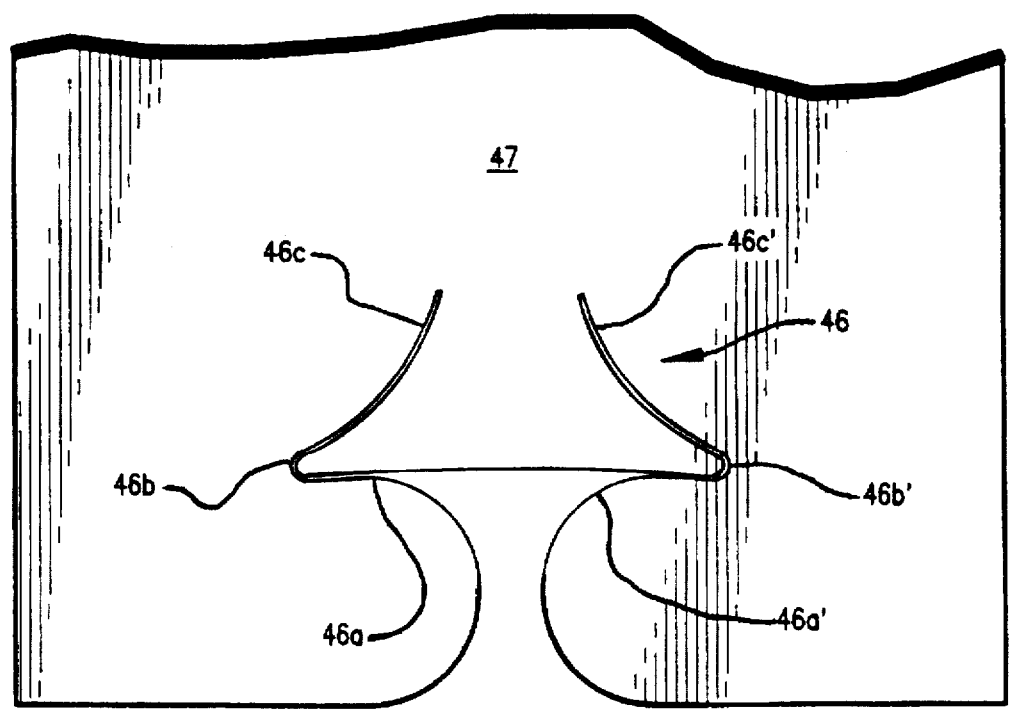
FIG. 4F is an elevational view of this folding plate without the web passing therethrough, so that the different sections of the slot formed in this plate can be readily seen.

Referring to FIG. 4A, when the clamping arm housings 36a and 38a are rotated into a horizontal position, the front faces of these housings will depress respective micro switches S03 and S03'. If either of these micro switches are depressed, the drive motor 64 will be stopped.

There is preferably located beyond the table 39 a splice thickness detector means S02 (shown diagrammatically only in FIG. 4) and a splice color detector means S02' (also shown diagrammatically only in FIG. 4). Detector S02 can be a micro switch with a feeler arm riding on the web. The splice detector S02' may be a detector purchased from the Tritronics Company of Tampa, Fla. under the model name Smarteye. The splicing tape used by the operator to splice the end of the web from one of the reels 12A or 12A' to the other, is a very thin splicing tape which can readily pass through the equipment including a slot in a web guide plate to be described which folds the web. However, the web wound on the reels 12A and 12A' frequently has splicing tape securing together sections of the web which tape has a thickness which would not go through this slot. When such a thick splicing tape is detected, the web feeding drive motor is stopped and this tape is replaced by a thin splicing tape if the slot-type folding means to be described is used. The start mode of the equipment is then initiated which will result in the strip containing the splice being ejected without being stacked in the stacking chamber.

If the splicing tape used by the fabricator of the web reels secures together different sections of the web on the reel is thin enough to pass through this folding slot, the fabricator is requested to make that tape a given color like red. When the red color is detected on the web by the splice tape color detecting means S02', the equipment being described operates in a mode where the strip cut from the web containing the red splicing tape is not stacked in the stacking chamber to avoid producing a defective honeycomb panel.

The web extends from the splicing table 39 and passes over an idler roller 40 then down and around the bottom of an idler roller 41 forming part of a tension control system re best shown in FIG. 4A. It includes a dancer pivotably mounted arm 43a carrying the idler roller 41 and beneath which the web passes to exert an upward force on the dancer arm 43a. A downward pull is exerted on the dancer arm by a pneumatic unit 43b having a piston rod 43c secured to the arm. The movement of the dancer arm controls the operation of a potentiometer 43d forming part of the controller purchased from the Electroid Company which generates a signal fed to the brake control mechanism exerting an adjustable opposition force to the rotation of the reel shafts 28—28'. The tension control unit operates to keep the dancer arm 43a horizontal. The pull down force of the pneumatic unit 43b is initially adjusted to exert a given predetermined force. For example, in the presence invention where the exemplary strip material is material No. 5040 manufactured by the Asahi Company (a strip 0.006" thick, 2.25" wide, and having a density of 40 grams per square centimeter), a seven pound tension force is applied to the dancer arm 43a. If the upward pull force on the dancer arm 43a exceed this seven pound force, the dancer arm will move up and a signal will be fed back to the friction brake mechanism on the selected reel shaft which will reduce the friction force on the shaft. This reduces the tension on the web so as to keep the dancer arm 43a in a horizontal position.

If the web extending around the idler roller should break and not be present for any other reason, the dancer arm 43a will obviously drop. A suitable light sensor R10 will sense this condition and generate a signal which will stop operation of the web feed motor.

The web leaving the tension roller 41 passes over the top of an idler roller 42, then down around the bottom of a pair of idler rollers 37 and 37' and then over the top of an idler roller 44, where it then passes through a folding unit 47 best shown in FIGS. 4E and 4F. The folding unit 47 includes a slotted guide plate having formed therein a uniquely curved web pass-through slot generally indicated by reference numeral 46. This slot has a partially collapsed U-shape. It thus includes a generally horizontally extending bottom portions 46a—46a' which terminates in reversely curved portions 46b—46b' which respectively join upwardly angled and oppositely curved upper portions 46c—46c'. As best shown in FIG. 4E, the overall length of the slot generally corresponds to the width of the web to be folded. The slot 46 for a web material of the exemplary 0.006" thickness is preferably about 0.009" wide. As the web passes through the slot, the opposite longitudinal edge portions 13a—13a' thereof are folded upwardly. Where the unfolded web has the exemplary 2.25" width, after being folded it is 1⅛" wide. There is thus left a small space of 1/32" between the ends of the folded over portions of the web. Since the web is pulled forwardly by a drive roller to be described, it passes reversely around an idler roller 45 in its folded state to contact a heat drum 48.

The drum 48 may be mounted for rotation about a shaft 48a and is heated by electrical heating elements 50 through which current flows in a controlled manner, to set the temperature of the surface of the drum to a desired value. Electrical current is fed to these heating elements by commutators 53—53' mounted on the drum shaft 48a as shown in FIG. 4I. The shaft 48a has shaft extensions 48a'—48a" projecting from opposite sides of the drum 48. In a manner to be described, the drum is controllably urged upward toward the rollers 45—45' to press the folded web against the surfaces of these rollers sometimes referred to as abutment surfaces. In the exemplary invention being described, the drum has a fifteen inch diameter and the web extends around approximately 340°–350° of the drum circumference. The drum surface temperature is set to approximately 350° Fahrenheit for the exemplary web material involved and the web is moved around the drum surface at a speed of 250 feet per minute. The web upon leaving the drum bends around driven roller 45' supported on a pneumatic unit 55A as shown in FIG. 4G.

The folded over web is pressed against the drum by adjustable pressure rollers 46 spaced around the drum. These pressure rollers are carried on the ends of support frames in turn connected to the pistons of pneumatic units 46A. A similar pneumatic unit 55A is shown in FIG. 4G. It carries a roller 55 pressing against the web leaving the drum against the driven roller 45' previously referred to. The roller 45' rotates the drum which moves the web along with its rotation. The pneumatic units 46A can be operated to selectively withdraw the rollers carried thereby from the drum or the rollers 55 from the driven roller 45' or to press the roller carried thereby with a set pressure against the web passing beneath the rollers. When the exemplary Asahi material previously described is utilized, this pressure is preferably 40 pounds. When the pressure rollers are withdrawn from the drum, a suitable sensor (not shown) will identify that fact.

The pressing of the web against a surface heated to a temperature which is at or above what is called the annealing temperature of the web material will set the fold made therein by the folding apparatus, as is well known for many years in the prior art formation of pleats in zig-zag and honeycomb polyester panel materials. It has also been well known for many years that to decrease the setting times over ambient air cooling the folded panel is subjected to a cooled environment as it is held in its desired folded state. U.S. Pat. No. 3,281,516 to Southwich discloses the application of pressure and heat to a thermoplastic material, followed by cooling, to permanently fix a folded contour in thermoplastic materials.

The web materials which can be handled by the equipment being described can have various thicknesses. Since it takes a longer time to heat a thicker web than a thinner one, when one changes from a web of one thickness to another, assuming the basic material stays constant, the web speed is generally increased in inverse proportion to the thickness of the material. Also, instead of just varying the web speed, one can also vary the temperature of the drum surface. Thus, if a web of increased thickness is to be folded and set, the web speed can be decreased and the drum surface temperature can be increased somewhat if desired to obtain the best results. The temperature to which the material is heated is the important objective. That temperature must be below the melting temperature of the material and high enough to form a set fold.

Another unique aspect of the present invention involves the substantial reduction of a transverse bow or a waviness in the longitudinal profile of the folded tube-forming folded strips 4 shown in FIG. 1. Such a wavy or bowed profile can be caused by unevenness in the web thickness or web stresses caused in the process of manufacture of the original unfolded web from which the folded strips 4 are made. This bowing and waviness can also be caused by unsymmetrical stresses or thickness variations in the web, resulting from the printing of an ornamental pattern on only the half of the web which is to ultimately form the portions of expandable stacks of strips which are to face inwardly in the rooms in which the stacks are mounted as window coverings. It was discovered that this lateral bowing and longitudinal waviness in the strips can be materially reduced by uniquely controlling the distribution of the axial pressure forces exerted across the folded web as it is pressed between the rollers 45 and 45' and the heated drum 48.

Figure 4H:
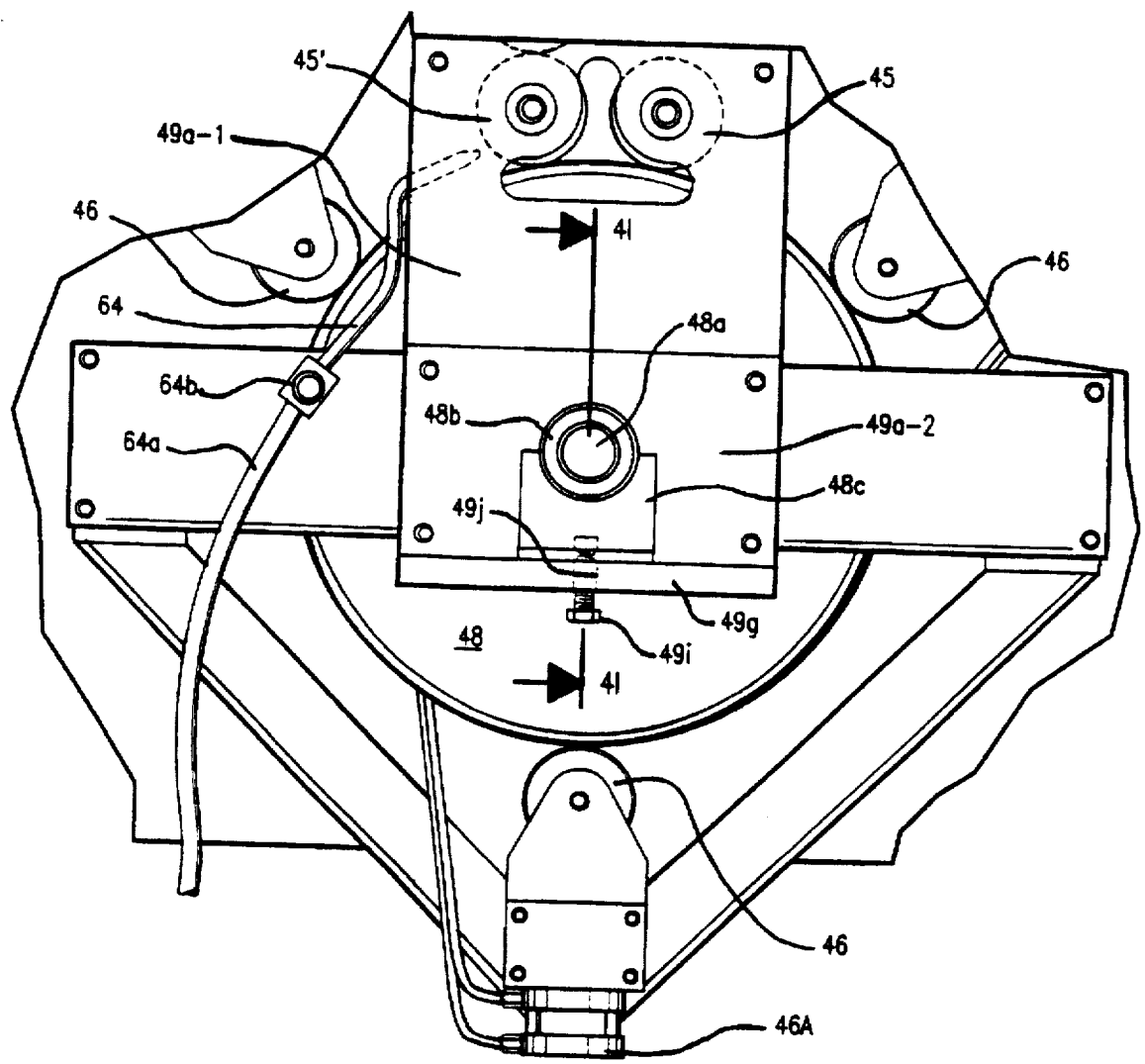
FIG. 4H is an enlargement of the side elevational view of the heated drum of FIG. 4B.
Figure 41:
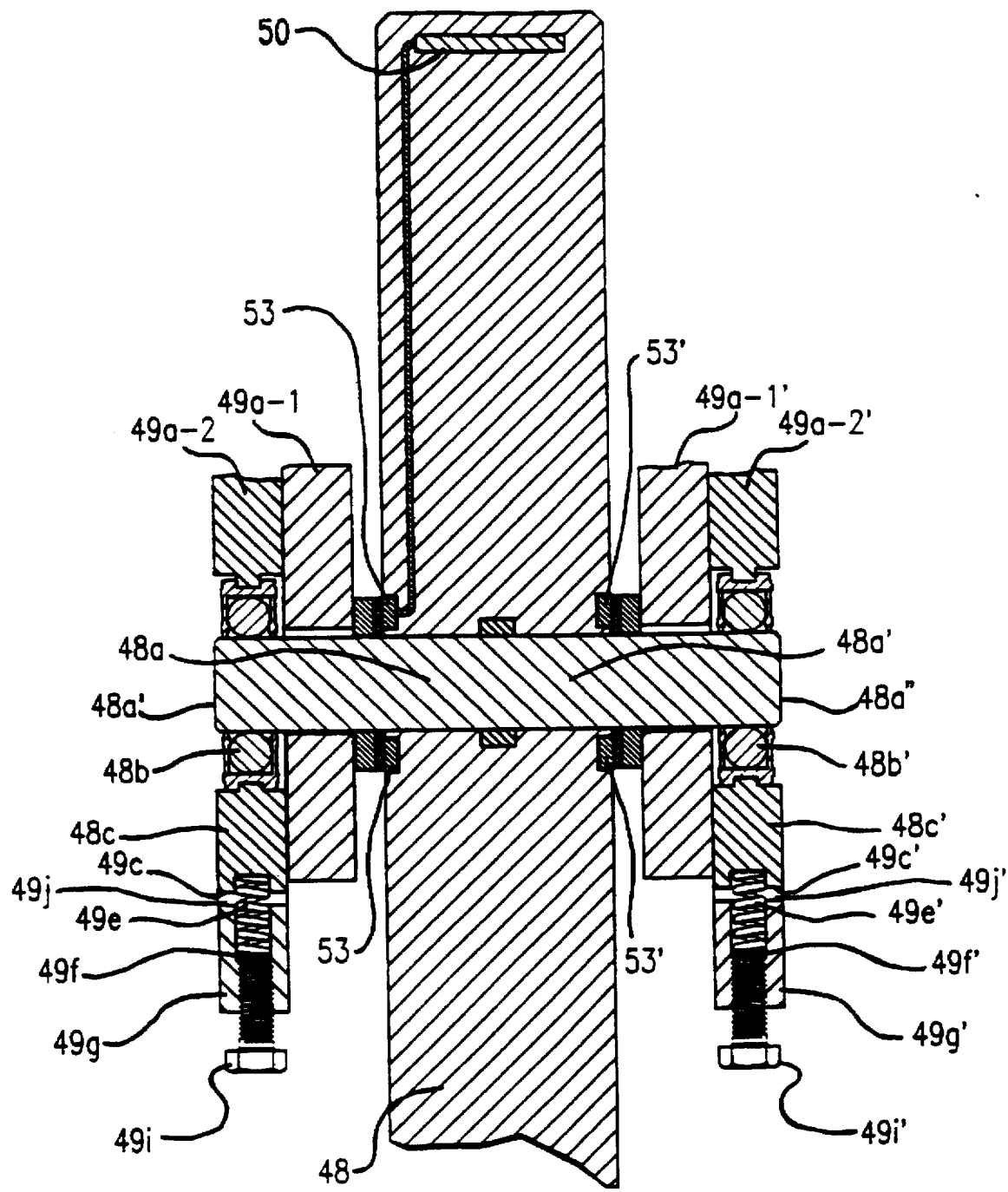

Accordingly, as best shown in FIGS. 4H and 4I, the drum shaft 48a is extended axially outwardly from the side surfaces of the drum 48 to form a pair of shaft extensions 48a' and 48a". These shaft extensions respectively pass through apertures in stationary vertical plates 49a-1—49a-1'. The shaft extensions also pass through bearings 48b—48b' mounted in downwardly facing curved apertures in stationary vertical plates 49a-2 and 49a-2'. The bottom sides of the bearings 48b—48b' rest in upwardly facing curved apertures formed in the top surface of slide plates 48c—48c'. The slide plates are urged upwardly by compressed coil springs 49e—49e' supported in vertical apertures formed in a pair of housings 49g—49g'. The shanks of set screws 49i—49i' thread through the bottom of the housing 49g—49g', and the upper ends of these shanks abut a pair of plates 49f—49f'. The bottom of the springs 49e—49e' rest upon these plates 49f—49f'. The upper ends of the springs 49e—49e' extend into downwardly facing apertures in the bottom of the slide plates 48c—48c'. There are gaps 49j—49j' between the bottom of the slide plates 48c—48c' and the top of the housings 49g—49g' so that there is a range of adjustability of the degree to which the springs 49e—49e' can be compressed. The degree to which the springs are compressed varies the upward force which these springs apply to the bottom of the bearings 48b—48b' and thus the axial distribution of forces applied between the folded web pressed between the drum periphery and the rollers 45—45'. It was found that by varying the difference in the degree of compression of these springs 49e—49e' a point is reached by trial and error where substantial transverse bowing or longitudinal waviness in the folded web can be eliminated. The variation in spring pressure modifies the distribution of forces compressing the web between the drum and rollers 45—45' to diminish the variations in the thickness and stresses across and along the web. This adjustment is made by observing the strips which are discharged from the cutting station to be more fully described hereafter.

Figure 4J:
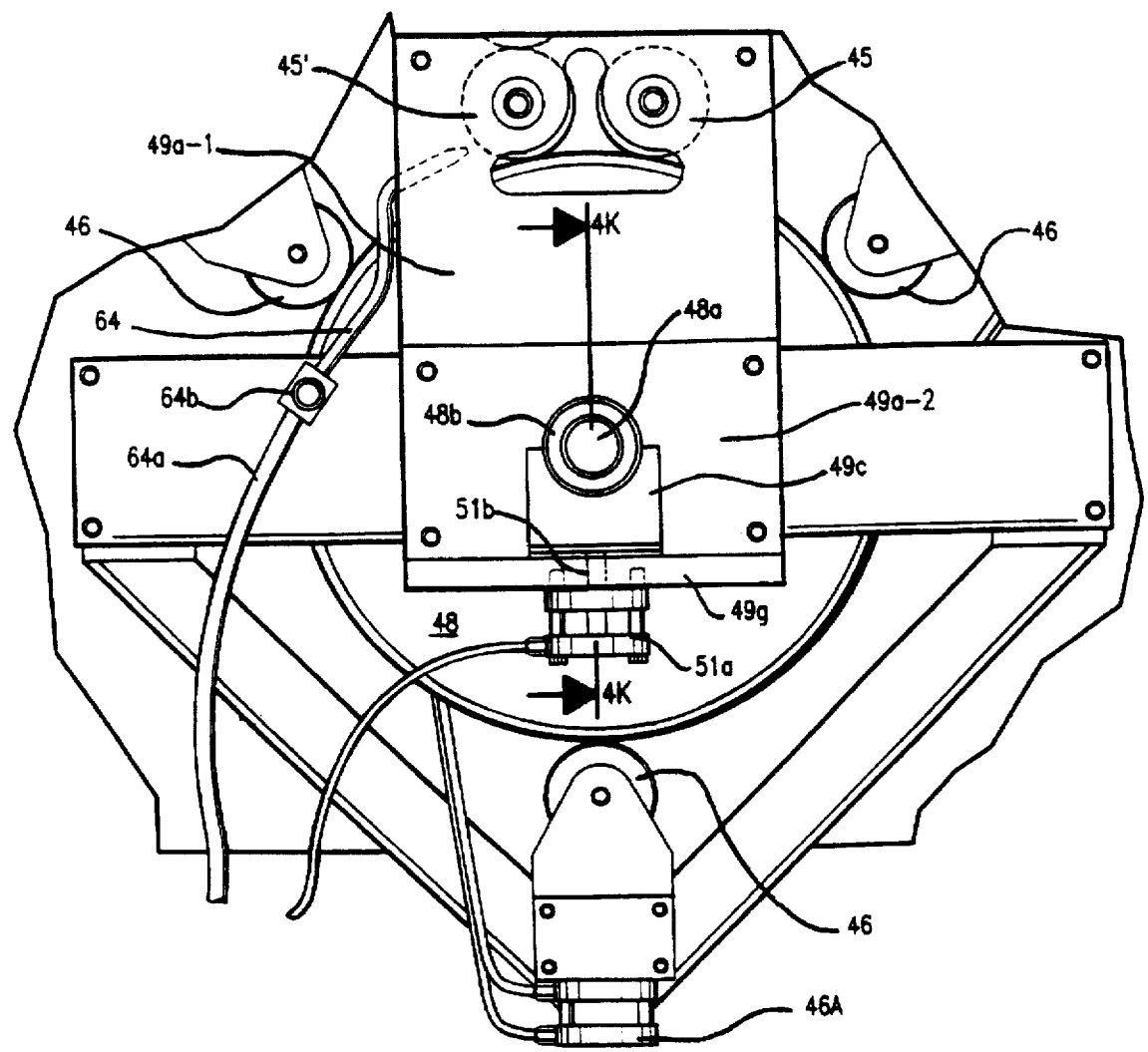
FIG. 4J is a view of the apparatus shown in FIG. 4H, but modified by the replacement of spring supports for the drum shaft extensions by pneumatic cylinder supports.
Figure 4K:
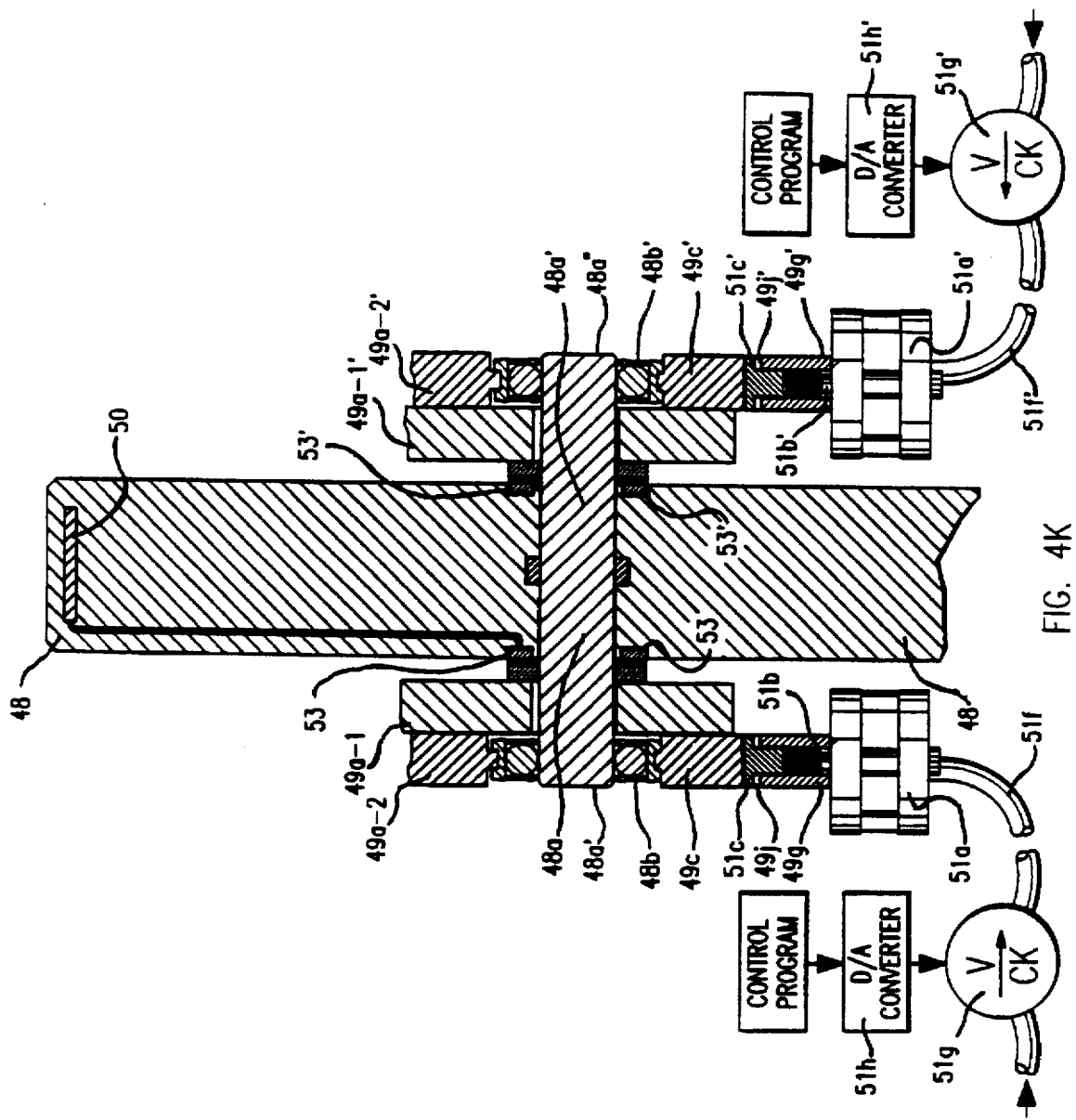
FIG. 4K is a fragmentary vertical sectional view through FIG. 4J, as seen along viewing plane 4H—4H.

The adjustable spring pressure adjustment means just described can be replaced by adjustment means including a pair of pneumatic cylinders 51a—51a' shown in FIGS. 4J and 4K to which reference should now be made. As best shown in FIG. 4K, the pneumatic cylinder 51a—51a' have pistons 51b—51b' carrying push members 51c—51c'. The push members 51c—51c' push against the bottoms of the slide plates 48c—48c' having upwardly facing curved openings in the tops thereof which receive the bottoms of the bearings 48b—48b'. The degree of upward force exerted by the push members 51c—51c' on the bearings 48b—48b' and in turn the shaft extensions 48a'—48a" are varied by varying the pneumatic pressure within the pneumatic cylinders 51a—51a'. Accordingly, as shown in FIG. 4K, a pair of pneumatic inlet lines 51f—51f' extend to the outlet of pressure adjusting valves 51g—51g'. These valves are sold by MFC of Japan under Model No. NOW-3000. These valves receive analog electrical input signals of a magnitude which produce a desired pressure in the outlets of the valves 51g—51g'. The analog inputs of these valves are connected to the outputs of digital to analog converters 51h—51h'. Suitable digital signals selected by operation of keys on the control panel of the apparatus select desired digital values representing the desired pressure outputs of the valves 51g—51g'. As previously indicated, these digital signals are selected by trial and error to minimize the lateral bowing or longitudinal waviness of the strips discharged from the cutting station.

To facilitate the cooling of the web leaving the drum a missing unit having a nozzle 64 is provided to spray a mist of moisture onto the web as it leaves the drum and passes around the driven roller 45'. This misting unit may be model No. 270 available from Amflo. The nozzle 64 receives its mist from an inlet tube 64a connected to the source of mist (not shown.) The mist emanating from the nozzle 64 absorbs heat from the hot web leaving the drum 48 and thus aids in the cooling of the same.

The web leaving the pressure and driven rollers 45 and 45' passes over the upper cooling table surface 58a of a metal body 48. The upper cooling table surface 58a is a slightly raised cambered (i.e. convexly curved) surface. The metal body 58 has a coolant passageway 58b through which passes a coolant fed by an inlet conduit 58c. In the exemplary form of the invention being described, the temperature of the cooling table surface 58a was 20° Fahrenheit. The cooling surface was 18" long. Thus, it is desired that the web speeds be substantial for mass production reasons, it is advantageous to use in addition to the cooling of the table surface and the mister further means for cooling the web surface. To this end, a heat dissipation block 59 is provided as best illustrated in FIG. 4C. This block rides upon the full width of the upper cooling table surface 58a. An exemplary block with a width of 1⅛", a height of 2" and a length along the longitudinal axis of the table of 4". The block 59 was kept from moving along with the web pulled over the table surface by an abutment plate 59b which may be anchored to the first of a pair of glue applicator heads 60—60'. The abutment plate extends down to a point where it abuts the forward face of the heat dissipation block 59 riding on the web.

The heat dissipation block 59 preferably has a series of horizontally extending through-passageways 59f through which is blown room air temperature air through a series of horizontally spaced nozzles 59g.

The web is pulled and stretched over the cooling surface so it maintained contact with the table over its 18" length. The table has 1½" recesses like 58' (see FIG. 4D) equally spaced from the peak center line of the table. The tips of a pair of glue applicator heads 60—60' discharge beads of adhesive on the web. The discharge ports of these heads have rectangular discharge ports 60a—60a' located during adhesive application just above the surface of the web passing below. In the case of the exemplary No. 5040 Asahi web material previously disclosed, each discharge port had a length of 0.010" in the direction of web movement and a width of 0.070". When the discharge pressure applied to the adhesive was 3,000 bars, this deposited an ideal adhesive band of 0.003" thick.

The temperature of the glue and the dispensing thereof are controlled in a well known manner. The entire glue applicator system including the glue applicator heads and the temperature controls therefor is a commercial unit sold by Nordson Corporation of 6755 Jimmy Carter Boulevard, Norcross, Ga. 30071 under the model designation PUR204. The desired glue temperature, of course, depends upon the particular adhesive which is used. As previously indicated, the preferred adhesive is obtained from the H. B. Fuller Company under order No. NP 2028. For this adhesive, the desired glue temperature is 120° C.

The glue applicator heads 60—60' are mounted on a common frame 62 for movement from a normally inoperative raised position to a lowered position where they press the web into the recesses 58'—58'. The adhesive applicator heads apply adhesive over the outer end portions of the web so as to produce the adhesive bands 6—6' previously described in connection with the description of the completed product shown in FIGS. 1 and 2.

To avoid waste of material, should the glue applicators fail to disperse glue on the web, a glue gap sensor S08 is provided just beyond the adhesive applicator heads 60—60. The sensor S08 preferably includes a sensing probe extending to a heat responsive device which generates a control signal when the probe fails to sense a heated source, namely the adhesive. This control signal stops the web drive motor.

Cutting Apparatus

Figure 5A:
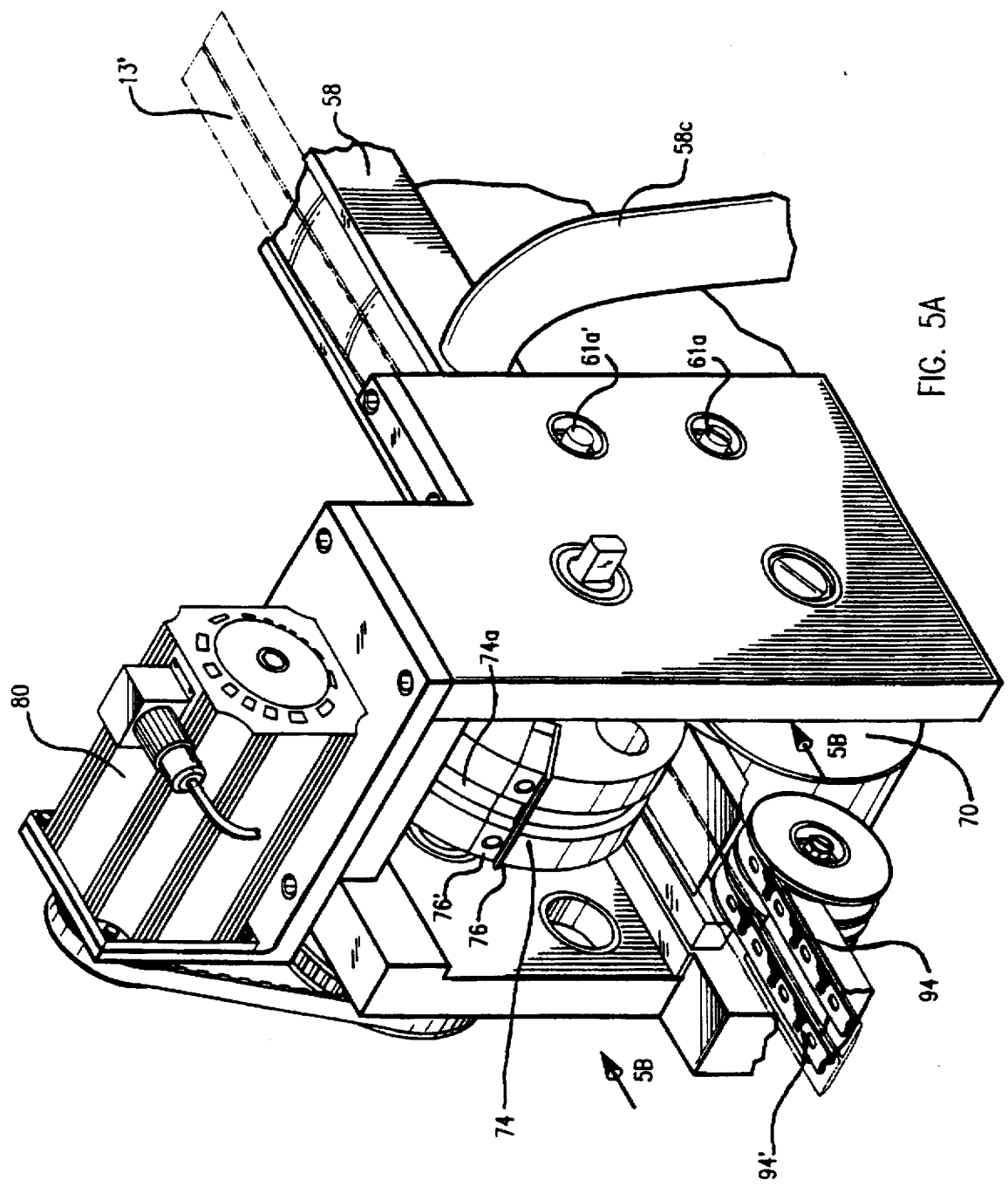
FIG. 5A is a perspective view of the different elements making up the web cutting station of the equipment illustrated in the drawings.
Figure 5B:
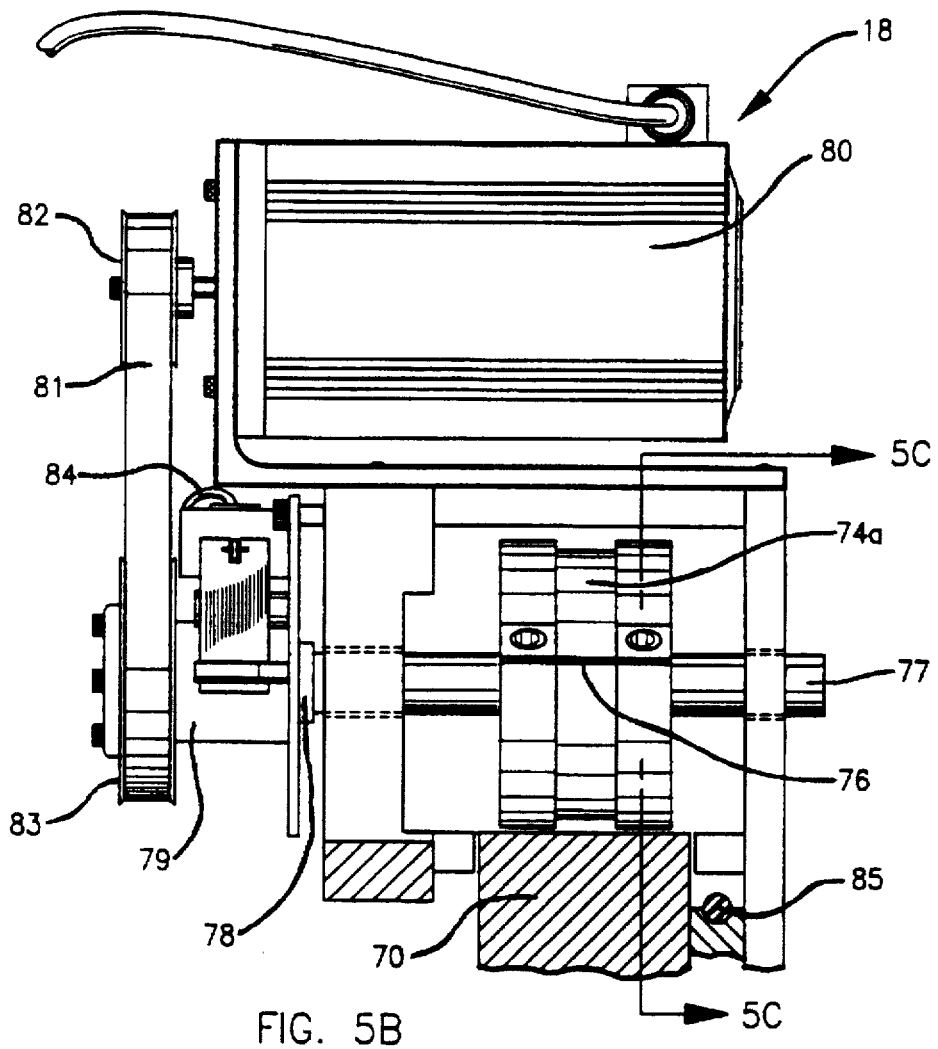
FIG. 5B is a vertical elevational view of the apparatus in FIG. 5A as seen in viewing plane 5B—5B therein.
Figure 5C:
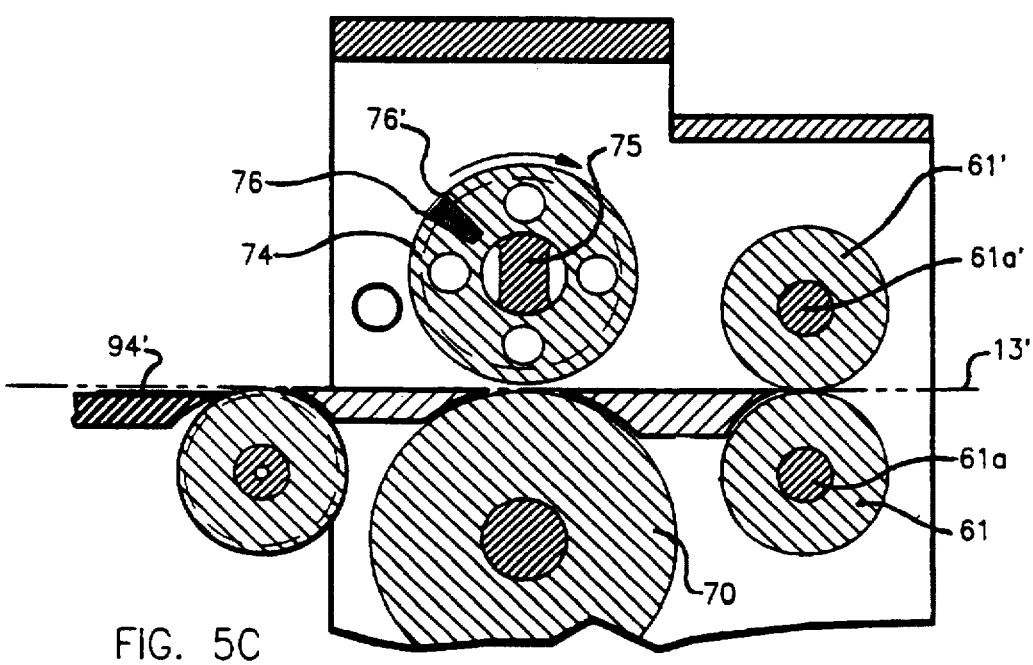
FIG. 5C is a vertical sectional view through FIG. 5B as seen in viewing plane 5C—5C therein.

The web leaving the cooling table is fed into an open-ended housing including the cutting apparatus 18. Refer now to FIGS. 5A, 5B and 5C which show this apparatus in its most preferred form. As best shown in FIG. 5C, the web entering the housing first passes between a bottom driven roller 61 and an upper idler roller 61' and then between a bottom driven roller 70 and an upper knife-carrying roller 74 basically designed by Frank Romeo of Fort Worth, Tex. The knife-carrying roller 74 has a slot 74a in the center thereof so as to provide a clearance space for the passage of the adhesive beads deposited on the upper surface of the web 13'. The bottom drive roller 61 and driven roller 70 are driven at a slightly higher (for example a 10% higher) peripheral speed than the driven roller 45' supported above the heating drum 48. The knife-carrying roller carries a knife blade 76 with a rounded edge held in place by a screw 76'. When the knife blade 76 is rotated opposite the driven roller 70, it just barely wipes on the surface thereof. A web fed between the cutter roller 70 and the driven roller 75 will bite through the web material 13' cleanly if it rotates at a much higher peripheral speed than the web passing by it. For example, the peripheral speed of the knife-carrying roller 74 is about twice the peripheral speed of the driven roller 45', such as 500 feet per minute.

The knife-carrying roller wheel 74 is secured to a shaft 77 which in turn connects to the output shaft 78 of a clutch 79. This clutch is preferably one sold by the Warner Electric Corporation of Pitman, N.J. under Model No. 306-17-051. The input shaft 79 to this Warner clutch shown is continuously driven by a motor 80 through a belt 81 extending between a pair of pulleys 82–83. The lower roller 75 is driven from the drive motor 64 through a belt 85. When the clutch 79 receives an input signal from an input control line 84, a solenoid 87 is momentarily energized to release the outer clutch shaft which rotates one revolution and then locks the output shaft in place. The start position of the knife blade 76 is preferably just above the web 13' so that the knife blade immediately starts to bite through the web as the solenoid is energized.

Timing Control

The timing of the operation of various parts of the equipment now being described, such as the cutter and stacking operations, is effected through timing pulses generated by a pulse encoder C05 (FIG. 5) coupled to the shaft of the web feeding driven motor 64. The pulses generated by this encoder are fed to various counters to be described. For example, as the web leaves the cooling table 58 it is fed to web cutting apparatus 18. The cutting apparatus is controlled by what is referred to as a cut counter means 61 shown in FIG. 11 to be described in more detail. When the web feeding drive motor comes up to speed, a drive motor speed sensing means 62 also shown in FIG. 11 resets the cut counter to zero and permits the feeding of pulses from the encoder C05, identified in FIG. 11 as a drive motor pulse generating means to the cut counter means.

The drive motor 64 is coupled in any suitable way, such as by drive belts and the like, to drives the various elements which feed the web through the cutting apparatus, and subsequently through a high speed conveyor system to the stacking apparatus to be described hereafter in detail.

A provision of the knife-carrying roller 74 rotating a curve-ended blade through the web passing thereunder and over a driven roller 75 is a development of Frank Romeo and forms no part of the present invention, although it is the preferred cutting means used to cut the web.

High Speed Conveyor System and Stacking Apparatus

Figure 6A:
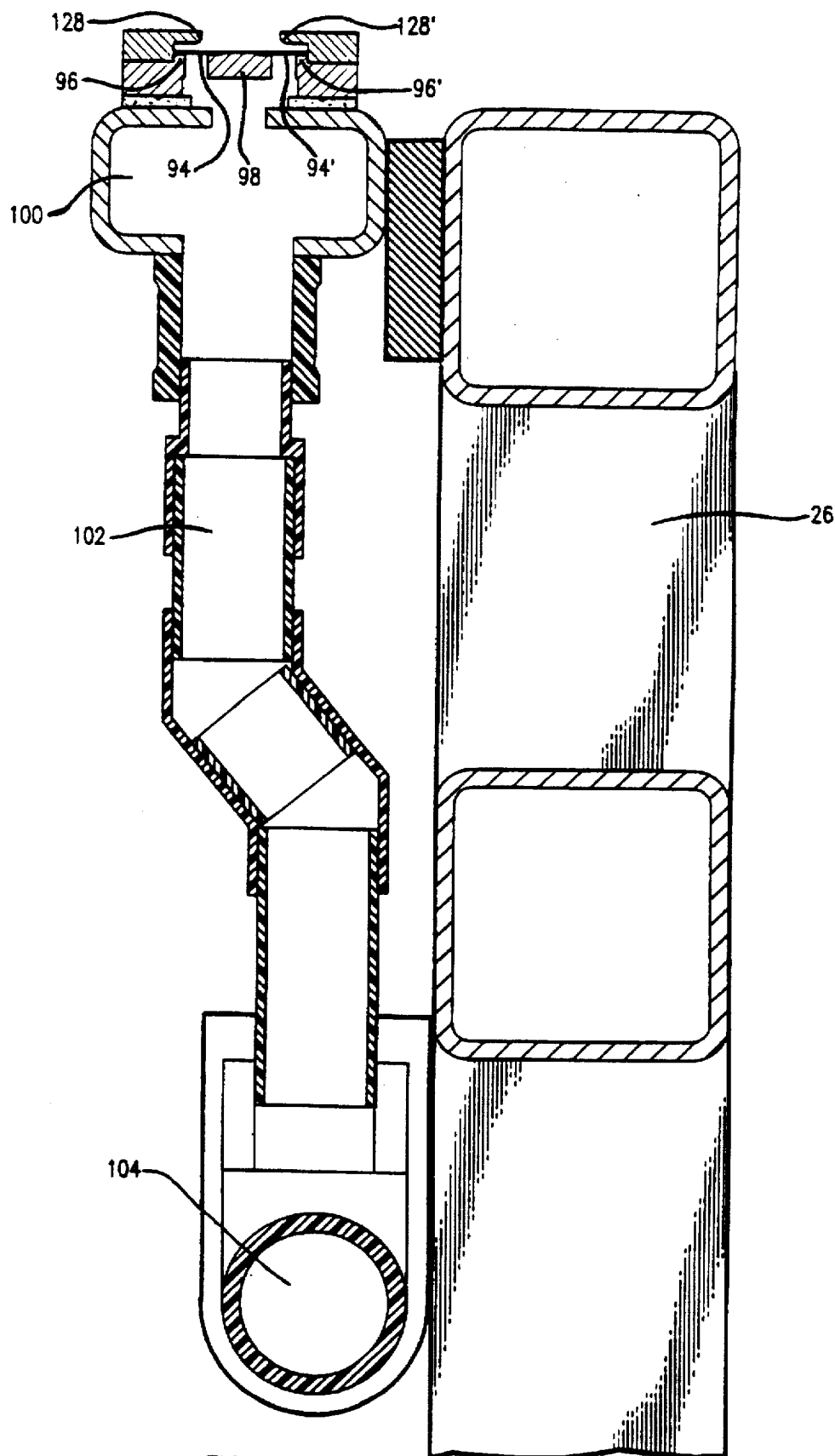
FIG. 6A is a transverse sectional view through the apparatus shown in FIG. 6 as viewed in the vertical viewing plane 6A—6A shown in FIG. 6.

Refer now to FIGS. 6–9 which illustrate an exemplary high speed conveyor system driven from the web feeding drive motor 64. The drive motor 64 through belts imparts rotation to a common drive shaft 109 in turn coupled to driven pulleys 92—92' around which extends endless apertured conveyor suction belts 94—94. The upper sections of these conveyor belts 94—94 have their longitudinal edge portions riding on support surfaces 96—96' and 98 (FIG. 6A). The central portions of the belts 94—94' have suction apertures communicating with a horizontal extending suction chamber 100. The chamber communicates vertically at spaced points therealong through vertical passageways 102 communicating with a main suction entry tube 104. The tube 104 extends to a source of suction through an inlet conduit 105 (FIG. 6). The suction applied through the belt apertures retains the strip cut by the cutting apparatus and discharged upon the inlet end of the conveyor belts 94—94' shown in FIGS. 6–7. The conveyor belts 94—94' are fed at approximately twice the speed that the web 13 or 13' is fed up through the cutting apparatus 18, such as 500 feet per minute.

The belts 94—94' are laterally spaced apart a distance to define a pusher bar pass-through slot 106 (FIG. 7). The conveyor belts 94—94' extend horizontally beneath the stacking chamber 22 as shown in FIGS. 8 and 9. As best shown in FIG. 8, the lower section of the conveyor belts 94—94' are guided by guide rollers 110, 112, 114 shown in FIG. 8 and guide rollers 116 and 118 shown in FIG. 6.

Figure 10:
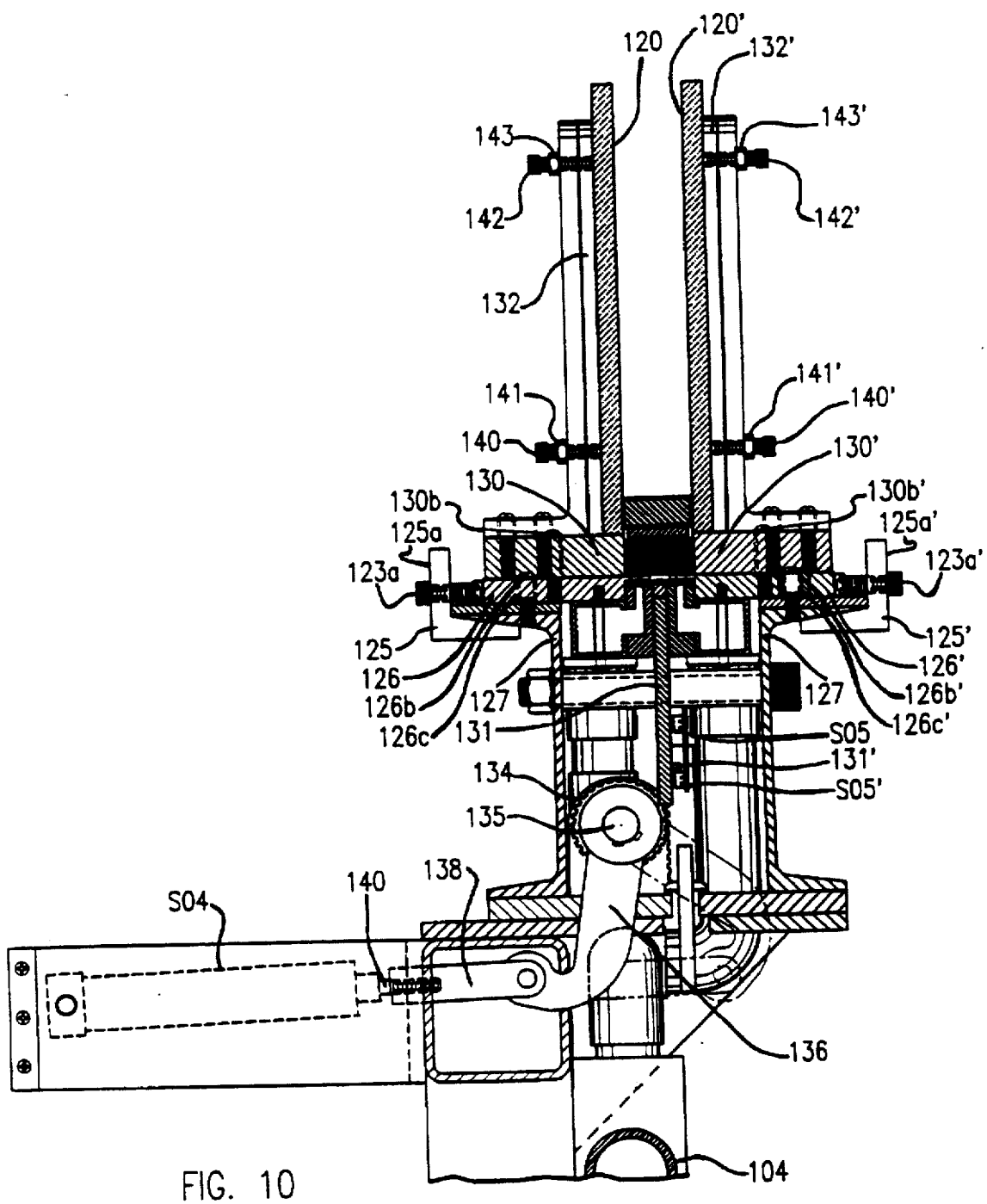
FIG. 10 is a transverse sectional view through the apparatus shown in FIG. 8, taken along section plan 10—10 thereof.
Figure 10A:
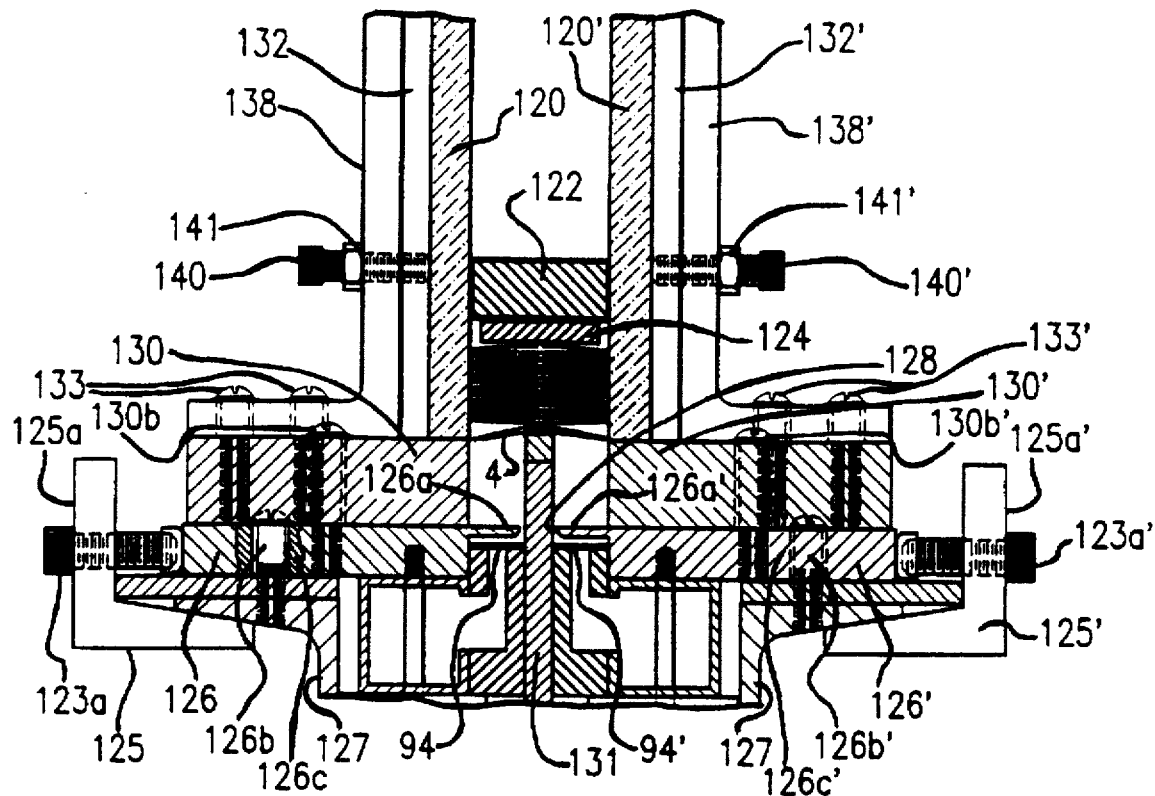
FIG. 10A is an enlarged view showing a portion of the apparatus shown in FIG. 10, as a pusher bar pushes a strip into the bottom portion of the stacking chamber of the stacking apparatus and against the strips above it to raise the entire stack above the floor of the stacking chamber.
Figure 10B:
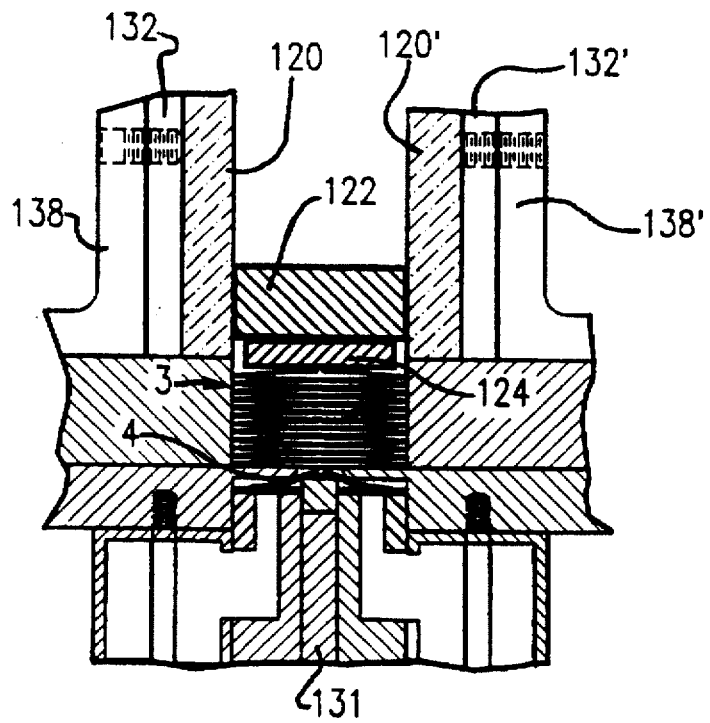
FIG. 10B is a view corresponding to FIG. 10A when the pusher bar shown in FIG. 10A is raised only slightly above its lowermost position, where a strip on the conveyor belt is pushed slightly into the slot in the bottom of the stacking chamber.

As shown in FIGS. 6–9, the stacking chamber 22 overlies about one-half the extent of the high speed conveyor belt system thereshown. Refer more particularly to FIGS. 10, 10A and 10B which show vertical sectional views through the stacking chamber 22.

The stacking chamber construction illustrated evolved from a number of previous much less reliable stacking chamber designs. Thus, the bottommost portion of the stacking chamber 22 is desirably defined between the confronting spaced vertical surfaces of a pair of metal bars 130—130' anchored in place by screws 131—131'. These bars, for example, when stacking the 1⅛" width strip referred to, preferably have a height of about 1.00" and a spacing of 1.135". This leaves a total clearance space of only 0.010". The stacking chamber above the bars 130—130' is defined between a pair of glass panels 120—120' secured by double sided adhesive tape respectively to a pair of aluminum bars 132—132'. In a manner to be described, the spacing of the glass panels 120—120' preferably diverge upwardly from their spacing at the bottom thereof of 1.135" matching the spacing between the bars 130—130'. The height of the exemplary panels being described is about 12." The spacing of the panels 120—120' at the top thereof is preferably 1.250" for the exemplary strips involved.

The assembly of the glass panels 120—120' and their associated aluminum bars 132—132' are supported at the inner faces from the vertical legs of pairs of angle members 138—138' spaced along the stacking chamber by bottom pairs of screws 140—140' and upper pairs of screws 142—142'. These screws pass freely through openings in the vertical legs of the angle members 138—138' and thread into threaded apertures formed only in the aluminum bars 132—132'. The threaded shanks of the screws 140—140' and 142—142' receive threaded locking nuts 141—141' and 143—143' bearing on the outer faces of the angle member legs. The rotation of the nuts adjusts the horizontal position of the assembly of each glass panel and aluminum bar at the point of connection of the associated screws and the aluminum bars. In this manner, the desirable spacing between the bottom and top portions of the glass panels are easily adjusted.

The stacking chamber 22 may, for example, be slightly over 12 feet in length as are the strips which are stacked in the chamber. Before the chamber is stacked with any strips, it contains an elongated rectangular weight bar 122 extending the full length of this chamber. The bar preferably weighs 8 pounds in the case where the particular 1⅛" strips described are being stacked. Beneath the bar is a narrower cardboard strip 124. The bottom of the stacking chamber has a floor defined by a pair of laterally spaced flanges 126a—126a' forming a longitudinal pass-through slot 128 extending the full length of the stacking chamber. The upper section of the conveyor belts 94—94' are located slightly below the slot 128. The slot 128 in the floor of the stacking chamber may have a width, for example, of 0.420" for the exemplary 1.125" folded strip involved.

The laterally spaced flanges 126a126a' are projections from a pair of bottom bars or plates 126—126' located beneath the bars 130—130' between which is defined the bottommost portion of the stacking chamber. The bars 130—130' are anchored to the plates 126—126' by vertically extending screws 130b—130b' passing through oversized apertures in the bars 130—130' and threaded into the plates 126—126'. The plates 126—126' have oversized holes or slots 126b—126' through which loosely pass the shanks of vertically extending locking screws 126c—126c' whose heads are exposed at the bottom of bores 130a—130a' formed in the bars 130—130'. Bearing against the outward vertical sides of the bars 126—126' are the ends of a pair of horizontally extending adjusting screws 123a—123a'. The threaded shanks of these screws thread through apertures in the vertical legs 125a—125a' of a pair of L-shaped brackets 125—125' welded to the bottom of an apertured frame 127.

To adjust the spacing between the bars 130—130' so that the width of the bottommost portion of the stacking chamber is only slightly larger (e.g. 0.0010") than the width of the stacked strips, adjusting screws 126b—126b' are loosened and the adjusting screws 123a—123a' in the L-shaped blocks 125—125 are rotated to effect the desired spacing and centering of the bars 130—130' carried on the plates 126—126'. When the desired adjustment is achieved locking screws 126b126b' are tightened.

The various screw pairs 133—133', 130b—130b', 126c—126c' and 123a—123a and the apertures through which they extend are duplicated at a number of points along the length of the stacking chamber. For example, there are preferably seven such points along the stacking chamber.

When a strip to be stacked is delivered by conveyor belts 94—94' in alignment with the slot 128 in the floor of the stacking chamber, it is pushed into the stacking chamber through the slot by a pusher bar member illustrated in FIGS. 10 and 10A as a vertical, rectangular bar 131. As best shown in FIG. 10, this pusher bar 131 is attached to a number of horizontally spaced rack-forming plates 132 mounted opposite various points below the stacking chamber 22, and suitably guided for vertical movement as by guide pins 132'. Each rack-forming plate 132 has rack teeth 132' which are engaged by the teeth of a pinon gear 134. The various pinon gears 134 are rotatably supported on a common shaft 135. The shaft 135 is attached to the end of an arm 136 in turn pivotally secured to a link 138 connected to the piston rod 140 of a pneumatic unit S04. All of the pneumatic units are controlled by valves in turn controlled by solenoids 137 shown in FIG. 4. The solenoids are electrically controlled by the electrical control system of the invention shown in FIG. 11. The pneumatic fluid under pressure is kept in a master pneumatic drum 137 shown by pneumatic lines of the valve portions of the solenoids 135.

When the solenoid controlling the pneumatic unit S04 receives a stack control signal, a piston 140 thereof becomes extended to rotate shaft 135 and cause each pinon gear 134 to rotate in a counterclockwise direction, as viewed in FIG. 10. As each rack plate 132 moves upward, it carries the pusher bar 131 attached to it upward. The pusher bar 131 is narrower than the space between the conveyor belts 94—94' and the width of the slot 128 in the bottom of the stacking chamber. When fully raised, the pusher bar 131 thus pushes the flexible strip of material off of the belts and through the slot 128 in the floor of the stacking chamber 22. The bar rises a distance above the chamber floor so as to push the strip involved against the adjacent strip in the stacking chamber and raises all the strips, for example, 0.750" above the chamber floor. The weight bar 122 applies a downward force as the pusher bar 131 applies an upward force, to compress the various strips together. FIG. 10A shows the pusher bar in its fully raised position and FIG. 10B shows the pusher bar in its fully lowered position.

As shown in FIG. 10, the pusher bar 131 has a projection 131' thereon which, in the upper position of the bar, operates what is sometimes referred to as a pusher up micro switch S05 to indicate that the bar is in its uppermost position. This projection will operate what is sometimes referred to as a pusher down micro switch S05' to indicate that the bar 131 is in its lower most position. The control system of the apparatus will de-energize the drive motors 64 if the projection on the bar 131 does not operate the pusher down micro switch S05' shortly after the pusher up micro switch S05 is operated or the pusher up micro switch is not operated when a signal is generated requiring operation of the stacker apparatus.

As previously indicated, the adhesive bands applied to the top of each of these strips are only partially dried and thus are sufficiently tacky to secure the strips together without separation or movement relative to one another during subsequent handling of the stacked material. The purpose for tapering the stacking chamber above the spaced rectangular metal bars 130—130' defining the bottom of the stacking chamber is to avoid the jamming of the strips in the stacking chamber in their elevated positions. The outwardly diverging confronting surfaces of the glass panels 120—120' assure that upon lowering of the pusher bar the stacked strips will follow the pusher bar down, until all the stack of strips rest upon the floor of the stacking chamber, as shown in FIG. 10B.

As the uppermost strip in the stacking chamber is pressed against the aforementioned cardboard strip 124, the adhesive on the top face thereof evenly bonds the strip thereto. This cardboard strip 124 can readily be pulled from the uppermost strip in the stack without tearing the same after the stacked strips are removed from the stacking chamber 22. The cardboard strip 124 helps to maintain the horizontal profile of the upper strip and, indirectly, all of the strips below, to avoid a waviness in the outline of the stack of secured together strips in the stacking chamber.

The timing of the operation of the pneumatic unit S04 is determined by the instant the trailing edge of the strip advanced by the conveyor belts 94—94' passes by what is referred to as a trailing edge sensor means S06 shown in FIGS. 6 and 7 at a point slightly behind the rear edge of the stacking chamber. This sensor can be a combination light source and sensor unit directing its light beam downwardly in alignment with the spacing between the conveyor belts 94—94'. When this sensor senses the transition between the reflection and non-reflection of light on the conveyor belts, a control signal is generated. Except when the movement of the pusher bar 131 is disabled under circumstances to be explained, the generation of this transition control signal will cause the push bar elevating pneumatic unit S04 to be operated after a predetermined amount of movement is imparted to the strip following this transition point, so that all the strips pushed into the stacking chamber are in substantial longitudinal alignment. The transverse alignment of these strips is determined by the adherence of each strip to the one above it in the stacking chamber.

There is also provided a leading edge sensor S07 positioned at the inlet end of the high speed conveyor system, as shown in FIGS. 6 and 7. This leading edge sensor senses the presence or absence of a leading or trailing edge of a strip being fed from the cutter. In case the strip is not fed from the cutter apparatus, there will be an absence of a transition from a light non-reflection to a light reflection state for a given minimum period of time indicating the absence of a further strip emanating from the cutting apparatus. If desired, the control portion of the invention can stop the drive motor if this occurs. Of more importance is to stop the drive motor if the cutting wheel fails occasionally to cut through the web. A counter set and reset by the passage respectively of the leading and trailing edges of a strip by sensor S07 so the drive motor 64 is stripped when the count exceeds a given count indicating a cut failure.

Signals generated by the various sensors described may be fed to a programmable logic controller (PLC) which may be of conventional construction. This controller, together with many manual switches and indicator lights, would be contained in the cabinetry generally indicated by reference numeral 141 in FIG. 4. This programmable logic controller can, for example, be a controller manufactured by Toshiba Corporation under the order designation EX Series.

Figure 11:
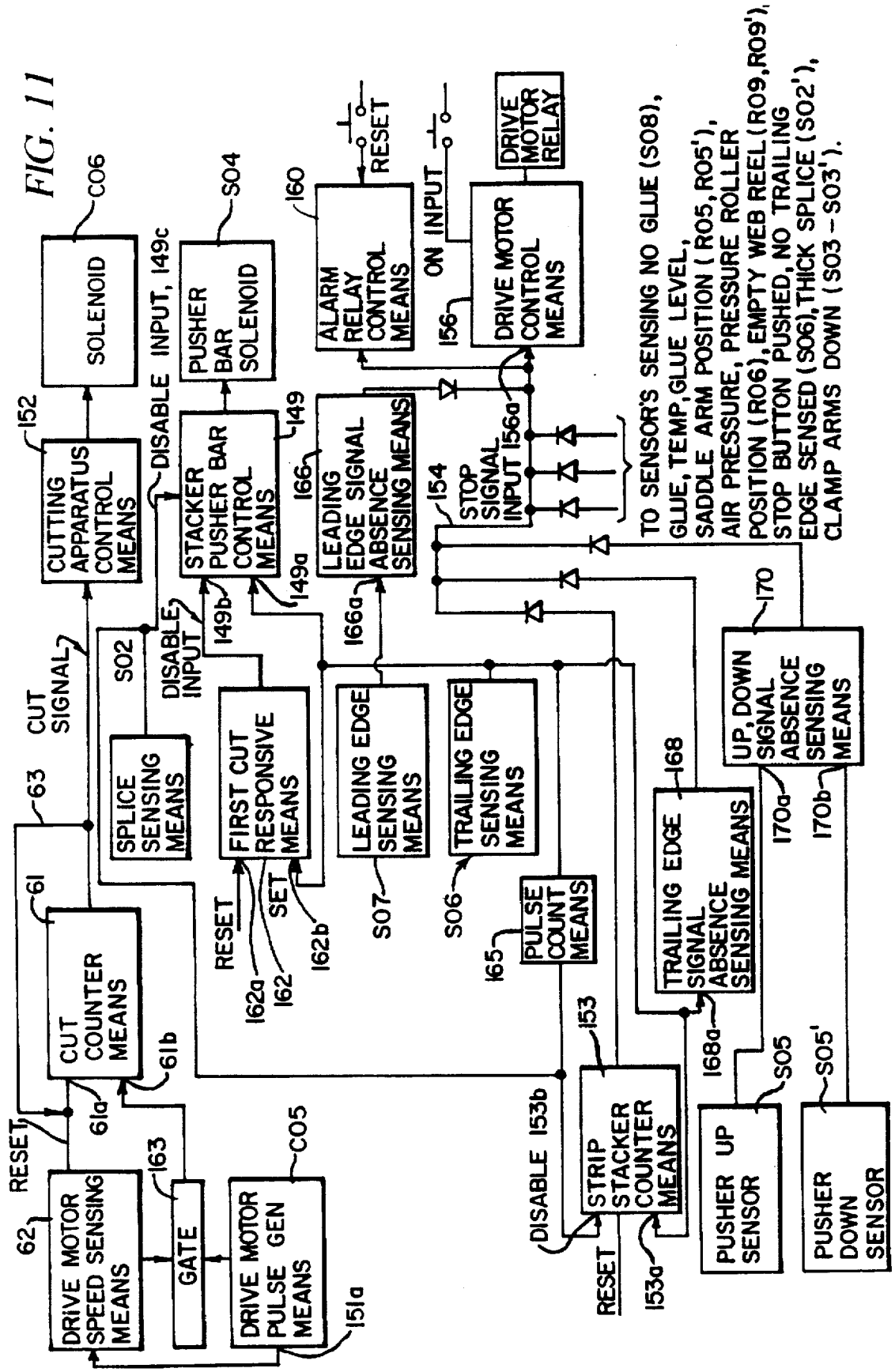
FIG. 11 is a functional block diagram showing the manner in which the various sensors and the elements of the equipment of the present invention controlled thereby interrelate with one another.

Logic Block-Diagram of FIG. 11

FIG. 11 is a functional block diagram showing in the various blocks thereof sensors, counters, and control means responsive thereto to control the operation of a web feeding drive motor relay 158, cutter solenoid C06, pusher bar solenoid S04 and an alarm relay control means 160. The count and control functions could be performed by hardware or software. When a start switch on control panel 44 (FIG. 5) is initially operated, this effects automatic resetting of all of the counters and initiates a start mode of operation of the equipment. In the start mode, the first strip cut from the web must not end up in the stacker since it will not have the proper band of adhesive applied thereto. Also, the start mode should not be effective to energize the drive motor through its drive motor relay 158 unless various sensors indicate that the system is in proper operating order. To this end, a drive motor control means 156 has a stop signal input which, when receiving a stop signal, prevents energization of the drive motor relay 158 to prevent energization of the drive motor 64. As shown, the stop signal input line to the drive motor control means 156 extends to various sensors some not shown in the drawings and some shown in the drawings. These sensors generate a stop signal preventing the energization of or de-energizing the drive motor 64. Such a stop signal will be generated when various sensors indicate the absence of glue on the web (sensor S08); inadequate glue temperature; inadequate glue level; positions of reel saddle arms 29—29' indicating that both red saddle arms are not properly positioned (sensors R05—R05'); inadequate air pressure; raised position of pressure rollers; empty web reels (sensors R09—R09'); stop button pushed; no trailing edge sensed by sensor S01; overly thick splice sensed by sensor S02, etc. If all elements of the system are in a "go" condition, then the functions now to be described will be carried out.

A drive motor pulse generator C05 also referred to as a pulse encoder means develops pulses at its output at a rate in proportion to the speed of the shaft of the drive motor 64, as previously explained. These pulses are fed to the input of the driver motor speed sensing means 62. The sensing means 62, when the motor comes up to speed, open a gate 163 to feed pulses from the drive motor pulse generator means to the count input of a cut counter means 61. At the same time, the drive motor speed sensing means 62 will reset the cut counter means 61 to zero count by feeding a reset signal thereat. The cut counter means 61 generates a cut signal when the web being fed to the folding, adhesive-applying and cutting means moves slightly more than 12 feet, which is the length of the strips which is to be severed from the web by the cutter apparatus. When the stacked strips are removed from the stacking chamber, the strips are cut down precisely to a 12 foot length. When the cut counter means 61 reaches a count indicating the feeding of the web such a distance, the counter is automatically self-reset as indicated by the feedback loop line 63 and a cut signal is fed to cutting apparatus control means 152 which, in turn, operates the cutter motor solenoid C06 to initiate the cycle of operation of the cutting apparatus previously described.

When the equipment initially starts to operate, the reset input of a first cut responsive means 162 is in a condition indicating that a first cut has not yet occurred. When the trailing edge of the first strip cut by the cutting apparatus passes by the trailing edge sensing means S06 feeds a set signal to the set input 106 of the first cut responsive means indicating that the first strip has been cut and fed by the high speed conveyor belts 94—94' to the input of the stacking chamber. However, the output of the first cut responsive means is fed to a disable input 149b of a stacker pusher bar control means 149 which will prevent the pusher bar from being raised into a position to push the strip into the stacking chamber. Conveyor belts 94—94' will then move the strip involved off the discharge end of these conveyor belts. Any subsequent pulses fed from the trailing edge sensing means S06 by the first cut responsive means 162 will not be responded to. This could be achieved in any suitable way as, for example, by the software program programmed to generate a disable input signal only for the first pulse thereby from the trailing edge sensing means S06. The first cut responsive means 162 is in effect a pulse counter which carries out the desired disable function only on the first pulse it receives from the trailing edge sensing means S01. The output of the trailing edge sensing means S06 is also fed to a pulse counter 165 which will feed a disable pulse to the disable input 153b of a strip stacker counter means 153 (sometimes also called a stack level counter) only upon generation of the first signal by the trailing edge sensing means S06. The signals generated by the trailing edge sensing means S06 are also fed to the count input 153a of the strip stacker counter means 153. After the first disabled trailing edge signal pulse is generated the next signal generated thereby will be counted by the strip stacker counter means. When the count of the counter means 153 equals the desired number of strips to be stacked in the stacking chamber 22, this counter generates a stop signal fed to the stop signal input of the drive motor control means 156 to terminate energization of the drive motor. The stack of strips in the stacking chamber can then be manually or automatically removed therefrom.

Each time the trailing edge of a strip passes by the trailing edge sensing means S06, the control signal generated thereby is also fed to an input of trailing edge signal absence sensing means 168 and to the input 149a of stacker pusher bar control means 149. The trailing edge signal absence sensing means 168 generates a stop control signal when a given time interval passes after receiving a control signal from the trailing edge sensing means S01 indicating that strips are not being fed from the counter apparatus.

When the stacker pusher bar control means 149 receives a signal at its input 149a from the trailing edge sensing means S06, it will energize the pusher bar solenoid S04 to initiate upward movement of the pusher bar.

The signal generated by the pusher-up sensor S05 when the pusher bar is in its raised position is fed to one input 170a of an up-down signal absence sensing means 170. Similarly, the signal generated by the pusher-down sensor S07 when the pusher bar is returned to its lowered position is fed also to a second input 170b of the up-down absence sensing means 170. If the sensing means 170 does not receive within a given time interval both signals from the pusher up and the pusher-down sensors S05 and S02, it will generate a stop signal fed to the stop signal input 154 of the drive motor control means 156 since such a situation indicates some failure in the stacking process.

When leading edge sensing means S07 generates a control signal as the leading edge of a strip leaving the cutter passes thereby, this control signal is fed to the input 166a of a leading edge signal absence sensing means 166 which generate a drive motor stop signal fed to the stop signal input 156a of the drive motor control means 156 if a given time interval passes after the receipt of this control signal indicating that the cutter is not delivering anymore strips to the conveyor belts 94—94'. It also preferably generates a stop signal if the time following the passage of a leading edge of a strip exceeds a given time interval before the trailing edge passes thereby. The sensing means in such case has a counter which is set and reset by the passage of the leading and trailing edges of a strip.

When the splicing sensing means S02 senses the presence of a red splicing tape in the web unwinding from reel 12a or 12a', a signal is fed to the second disable input 149b of the stacker pusher bar control means 149. The operation of the pusher bar control will then be disabled, so that the strip containing the splice will not be pushed into the stacking chamber. Rather, it will be discharged at the end of the conveyor belts 94—94'.

When the stop signal input 156a receives a stop signal, it is also fed to an alarm relay control means which energizes an alarm light and sounds an audible alarm.

Software Program Control

FIG. 11 shows a functional block diagram to illustrate control of the equipment of the invention. This section describes such control in software program flow chart terms.

Counters

All counters (such as those shown in FIG. 11) obtain their inputs from an optical encoder pulse count (referred to previously as drive motor pulse generator means C05) which is coupled to the programmable logic controller (PLC). Since the encoder C05 is directly connected to the drive motor shaft any movement of the drive motor is counted by counters of the PLC. Resolution of each encoder pulse is approximately equivalent to 0.006" travel of the web.

1. Cut Counter
a. Start button is pushed and drive motor 64 begins accelerating.
b. Once programmed drive motor RPM has been reached, the cut counter is initialized to zero count.
c. Wait for counter to accumulate sufficient pulses for programmed cell length (nominally equal to slightly more than 12 feet) and then energize cut solenoid.
d. The cut counter is reset to zero count.
e. Steps "c" and "d" are repeated until a stop condition occurs after which the routine starts with step "a."

2. Stacking and Cell Height Counters
a. When power is initially applied to the machine, all counters are set to zero.
b. Start button is pushed.
c. Wait for first web cut.
d. Optical proximity switch S06 near stacker changes state and signals the PLC when trailing edge of cut fabric passes under it. PLC ignores signal and fabric is ejected from end of stacker. This first piece of fabric does not have glue applied to entire length since glue nozzles wait until programmed drive motor RPM has been reached before applying glue.
e. Wait for fabric cut.
f. Wait for optical proximity switch S06 to sense trailing edge.
g. Set cell height counter to zero.
h. After programmed count following operation of trailing edge sensor switch S06, energize pusher bar solenoid.
i. Increment Cell Height Counter (referred to also as strip stacker counter means).
j. If Cell Height Counter is less than programmed cell height (nominally 600 cells) then repeat steps "e" through "i."
k. Stop drive motor and reset height counter to zero. Return to step "b."

3. Gap Sense Counter
Strip cuts may not be correct. Optical proximity switch S07 located approximately 18 inches downstream of the cutting station is used to set and reset this counter as the trailing and leading edges of the strip from each cut pass under it.
a. Wait for strip cut.
b. Set gap sense counter to zero.

c. Check counter. If in excess of programmed counts, then trailing edge of strip is not detected in time by proximity switch S07 and the web was not cut at proper time. Stop Drive Motor so operator can repair. Return to step "a" otherwise continue to step "d."

d. Trailing edge reset counter to zero.

e. Check counter. If in excess of programmed counts, then leading edge of fabric was not detected by proximity switch S07. Stop Drive Motor so operator can repair otherwise continue with step "a."

4. Splice Detection—Butt end with tape and woven overlap

Factory splices are applied to strip within a reel so that a complete reel can be formed. The strip is butt-spliced with colored tape, nominally bright red. Special optical proximity sensor S02 optimized to sense colored tape are located downstream of the strip reel so that the following sequence is successful.

Another type of splice found in the reels are two ends of fabric woven together with an overlap of material. This leaves a noticeable "bump" at the splice. Mechanical switch S02' moved in a vertical direction senses the bump. It is also located downstream of the strip reel so that the following sequence is successful.

a. Wait until proximity switch S02' senses spliced tape.
b. Complete next web cut.
c. Complete another web cut.
d. Wait for cell to stack (from step "b" cut).
e. As trailing edge of next strip with splice tape on it passes stack proximity switch S06, inhibit stacking and eject strip out end of the conveyor belts 94—94'.

5. High/Low Reel Selection

There are two web reels on each machine namely, upper and lower reels 12A and 12A'. When web is threaded between two roller wheels located downstream of the reels, an optical proximity switch R08 between the rollers determine which reel is supplying web.

The web from the upper reel 12A rolls tightly underneath the leading roller 32 and over the following roller 34 allowing light from the proximity switch to reflect off web. Web from lower reel 12A' does not make contact with the leading roller due to a different supply angle and the proximity switch sees only free space.

The PLC therefore determines which reel has web being used and switches the brake control to the appropriate reel. The brake control is used in conjunction with the tension detector described to control the unspooling tension of a reel. The reel not selected is allowed to free turn.

Figure 12:
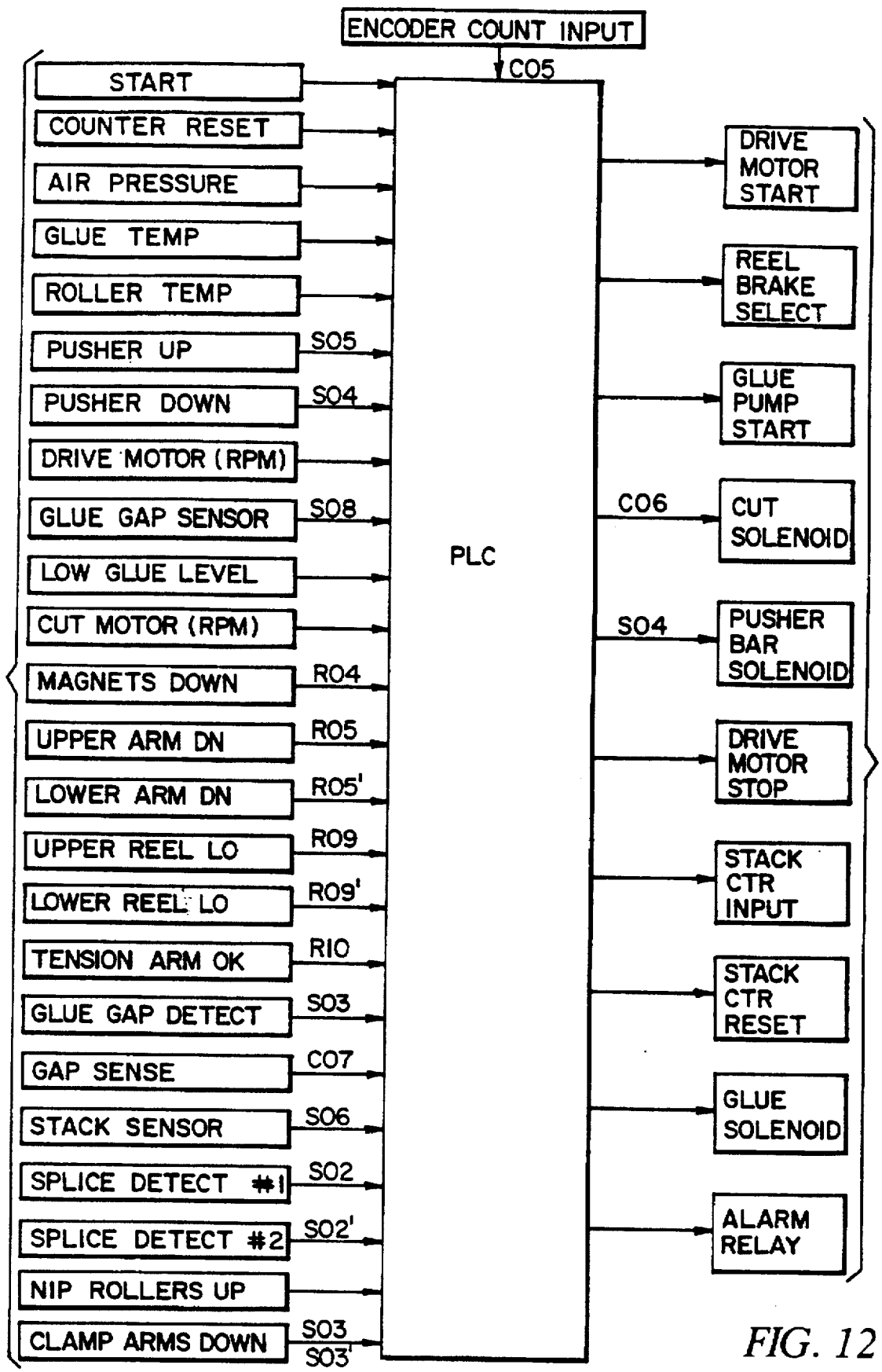
FIG. 12 shows the various sensor input and controller output signals respectively generated by the sensors and software used to control the equipment identified in the drawings.

FIG. 12 shows the various input and output signals respectively fed to and from the PLC.

Scope of Claims

While the invention has been described with reference to a preferred embodiment, it will be understood by those skilled in the art that various changes may be made and equivalents may be substituted for elements thereof without departing from the broader aspects of the invention. Also, it is intended that broad claims not specifying details of a particular embodiment disclosed herein as the best mode contemplated for carrying out the invention should not be limited to such details.

We claim:

1. A method of producing one or more individual stacks of superimposed, expandable tubular strips forming an expandable honeycomb panel, said method comprising the steps of: providing a continuous strip of material containing at least one line of adhesive, feeding the continuous strip of material through a cutter for cutting the continuous strip into individual strips of flexible material each forming a flat, expandable tubular body and having at least a central region on one side thereof which is adapted to be adhered to an adjacent strip when it is in contact therewith; accelerating said strips sequentially to the inlet of a stacking chamber having a floor with longitudinally extending slot of a length to receive each strip and which is narrower than the width of the strips to be delivered thereto, then sequentially pushing each strip through the narrower slot when in alignment with said slot and the strip or strips already in said chamber and adhering the adjacent strips together in the chamber wherein said stacking chamber is an elevated stacking chamber above said inlet thereto and said slot is in the bottom of said stacking chamber so each strip of the stack is pushed upwardly through said slot and against the strip above it.

2. A method of producing one or more individual stacks of superimposed, expandable tubular strips forming an expandable honeycomb panel, said method comprising the steps of: providing a continuous strip of material; feeding the continuous strip of material through a cutter for cutting the continuous strip into individual strips of flexible material each forming a flat, expandable tubular body and having at least a central region on one side thereof which is adapted to be adhered to an adjacent strip when it is in contact therewith; providing at least one band of adhesive to the top of the central portion of at least some of the strips, accelerating said strips sequentially to the inlet of a stacking chamber having a floor with longitudinally extending slot of a length to receive each strip and which is narrower than the width of the strips to be delivered thereto; then sequentially pushing each strip through the narrower slot when in alignment with said slot and the strip or strips already in the chamber and adhering the adjacent strips together in the chamber, wherein said stacking chamber is an elevated stacking chamber above said inlet thereto and said slot is in the bottom of said stacking chamber so each strip of the stack is pushed upwardly through said slot and against the strip above it, wherein each such strip when pushed through the slot in the bottom of the stacking chamber is forced against the strip above it to raise the same and provide better adhesion between the strips.

3. The method of claim 1 or, 2 wherein there is provided separate from the weight of the strips above the one being pushed into the stacking chamber a downward force on the top of the stack of strips in said stacking chamber as the strips are being stacked therein, so that good adherence of said strips is obtained.

4. The method of claim 3 wherein the strip pushed into the stacking chamber is pushed against the strip above it so as to raise the same at least slightly and, together with said downward force, results in a compression of the strips in said stack to improve the adherence of the strips in the stack.

* * * * *